United States Patent
Zhang et al.

(10) Patent No.: US 10,855,530 B2
(45) Date of Patent: Dec. 1, 2020

(54) METHOD AND APPARATUS FOR IMPLEMENTING COMPOSED VIRTUAL PRIVATE NETWORK VPN

(71) Applicant: HUAWEI TECHNOLOGIES CO., LTD., Guangdong (CN)

(72) Inventors: Liya Zhang, Wuhan (CN); Yuanshan Chen, Wuhan (CN); Zheng Lv, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 44 days.

(21) Appl. No.: 16/122,197

(22) Filed: Sep. 5, 2018

(65) Prior Publication Data

US 2019/0020539 A1     Jan. 17, 2019

Related U.S. Application Data

(63) Continuation of application No. PCT/CN2017/080090, filed on Apr. 11, 2017.

(30) Foreign Application Priority Data

Jun. 29, 2016  (CN) .......................... 2016 1 0493803

(51) Int. Cl.
  *H04L 12/24* (2006.01)
  *H04L 12/46* (2006.01)

(52) U.S. Cl.
  CPC ...... *H04L 41/0806* (2013.01); *H04L 12/4633* (2013.01); *H04L 12/4641* (2013.01)

(58) Field of Classification Search
  CPC .... H04W 52/146; H04W 52/42; H04W 52/58
  See application file for complete search history.

(56) References Cited

U.S. PATENT DOCUMENTS 5,768,271 A * 6/1998 Seid ................... H04L 12/2854
                                                    370/389
6,693,878 B1 * 2/2004 Daruwalla .......... H04L 12/2801
                                                    370/235

(Continued)

FOREIGN PATENT DOCUMENTS

| CN | 101247267 A | 8/2008 |
| CN | 101667969 A | 3/2010 |

(Continued)

OTHER PUBLICATIONS

Chinese Office Action dated Mar. 13, 2019 in corresponding Chinese Patent Application No. 201610493803.4 (5 pages).

(Continued)

*Primary Examiner* — Jenee Holland
(74) *Attorney, Agent, or Firm* — Fish & Richardson P.C.

(57) ABSTRACT

This disclosure provides a method and an apparatus for implementing a composed virtual private network (VPN). The method includes: obtaining a service type and a customer site that are input by a user; determining an access point corresponding to the customer site; determining one or more segment VPNs according to the service type and the access point corresponding to the customer site; obtaining a composed VPN according to the one or more segment VPNs; and outputting an access point list and a segment VPN list of the composed VPN to the user.

14 Claims, 11 Drawing Sheets

(56) References Cited

U.S. PATENT DOCUMENTS

| | | | | |
|---|---|---|---|---|
| 7,072,657 | B2* | 7/2006 | Watanabe | H04W 36/0038 370/328 |
| 7,633,909 | B1* | 12/2009 | Jones | H04W 12/0808 370/338 |
| 7,818,283 | B1* | 10/2010 | Bajpay | H04L 12/4641 707/E17.005 |
| 7,881,215 | B1* | 2/2011 | Daigle | H04L 67/142 370/252 |
| 8,443,435 | B1* | 5/2013 | Schroeder | H04L 63/08 726/15 |
| 8,631,115 | B2* | 1/2014 | Sheinfeld | H04L 12/66 370/241 |
| 8,953,590 | B1 | 2/2015 | Aggarwal et al. | |
| 9,615,126 | B2* | 4/2017 | Ramamurthy | H04L 65/4084 |
| 9,912,673 | B2* | 3/2018 | Evenden | H04L 9/3226 |
| 2003/0097442 | A1* | 5/2003 | Farhat | H04L 12/5691 709/224 |
| 2003/0165153 | A1* | 9/2003 | Maggio | H04L 1/188 370/437 |
| 2004/0209613 | A1* | 10/2004 | Hunter | H04L 12/4641 455/426.1 |
| 2004/0264427 | A1* | 12/2004 | Jaakkola | H04L 29/12009 370/338 |
| 2005/0177515 | A1* | 8/2005 | Kalavade | H04L 63/0892 705/52 |
| 2005/0198306 | A1* | 9/2005 | Palojarvi | H04L 63/0272 709/227 |
| 2005/0201388 | A1* | 9/2005 | Suh | H04W 76/12 370/395.53 |
| 2005/0204036 | A1* | 9/2005 | Farhat | H04L 41/5009 709/224 |
| 2006/0010484 | A1* | 1/2006 | Fujino | H04L 63/08 726/3 |
| 2006/0018300 | A1 | 1/2006 | Westberg et al. | |
| 2006/0195900 | A1* | 8/2006 | Yeh | H04L 63/0272 726/15 |
| 2007/0150732 | A1* | 6/2007 | Suzuki | H04W 12/06 713/168 |
| 2007/0271606 | A1* | 11/2007 | Amann | H04W 12/02 726/15 |
| 2007/0299954 | A1* | 12/2007 | Fatula | H04L 63/0272 709/223 |
| 2008/0148276 | A1* | 6/2008 | Kerr | G06Q 10/107 719/313 |
| 2008/0259873 | A1* | 10/2008 | Ahmavaara | H04W 36/0033 370/331 |
| 2010/0165928 | A1* | 7/2010 | Chen | H04L 67/2814 370/329 |
| 2010/0296457 | A1* | 11/2010 | Hosono | H04W 12/001 370/328 |
| 2011/0286452 | A1 | 11/2011 | Balus et al. | |
| 2012/0002815 | A1* | 1/2012 | Wei | H04L 12/4633 380/270 |
| 2012/0079113 | A1* | 3/2012 | Zhu | H04L 63/0272 709/225 |
| 2013/0230057 | A1* | 9/2013 | Hori | H04L 69/22 370/466 |
| 2013/0286985 | A1* | 10/2013 | Yin | H04L 61/2007 370/329 |
| 2014/0068750 | A1* | 3/2014 | Tjahjono | H04L 63/164 726/15 |
| 2014/0219135 | A1 | 8/2014 | Li et al. | |
| 2014/0294004 | A1 | 10/2014 | Balus et al. | |
| 2015/0006737 | A1* | 1/2015 | Chen | H04L 12/4633 709/226 |
| 2015/0113123 | A1* | 4/2015 | Yeung | H04L 41/12 709/224 |
| 2015/0188949 | A1* | 7/2015 | Mahaffey | H04L 63/20 726/1 |
| 2016/0073327 | A1* | 3/2016 | Clougherty | H04L 12/4633 370/254 |
| 2017/0230335 | A1* | 8/2017 | Walker | H04L 63/083 |
| 2018/0262365 | A1* | 9/2018 | Lee | H04L 63/0272 |

FOREIGN PATENT DOCUMENTS

| | | |
|---|---|---|
| CN | 102571433 A | 7/2012 |
| CN | 103634217 A | 3/2014 |
| CN | 105656673 A | 6/2016 |
| EP | 2747340 A1 | 6/2014 |

OTHER PUBLICATIONS

Extended European Search Report dated Dec. 19, 2018 in related European Patent Application No. 17818887.6 (11 pages).

Hao, W. et al, "Inter-AS Option B between NVO3 and MPLS EVPN network," draft-hao-l2vpn-inter-nvo3-evpn-00.txt, Internet Draft, Jul. 4, 2014, pp. 1-14.

Litkowski, S. et al, "YANG Data Model for L3VPN service delivery," draft-ietf-l3sm-l3vpn-service-model-09, L3SM Working Group, Internet-Draft, Jun. 10, 2016, pp. 1-158.

International Search Report, dated Jun. 28, 2017, in International Application No. PCT/CN2017/080090 (4 pp.).

Written Opinion of the International Searching Authority, dated Jun. 28, 2017, in International Application No. PCT/CN2017/080090 (7 pp.).

Office Action issued in Chinese Application No. 201911308055.8 dated Aug. 12, 2020, 15 pages (with English translation).

* cited by examiner

METHOD AND APPARATUS FOR IMPLEMENTING COMPOSED VIRTUAL PRIVATE NETWORK VPN

CROSS-REFERENCE TO RELATED APPLICATIONS

This application is a continuation of International Application No. PCT/CN2017/080090, filed on Apr. 11, 2017, which claims priority to Chinese Patent Application No. 201610493803.4, filed on Jun. 29, 2016. The disclosures of the aforementioned applications are hereby incorporated by reference in their entireties.

TECHNICAL FIELD

This disclosure relates to the communications field, and more specifically, to a method and an apparatus for implementing a composed VPN.

BACKGROUND

In the prior art, an operator needs a network across multiple domains and multiple different technology types to implement a complete VPN service, for example, an enterprise private line service or an enterprise network access service. As shown in FIG. 1, an operator creates a VPN service across a domain A and a domain B for three sites: a site 1, a site 2, and a site 3 of a customer. A service connection mode for the domain A is a virtual leased line (VLL), and a service connection mode for the domain B is an L3VPN.

For the customer, the customer buys an end-to-end layer 3 (L3) private network service. The service connects three branches: the site 1, the site 2, and the site 3. As shown in FIG. 1, the service actually passes through two networks: a network A (corresponding to the domain A shown in FIG. 1) and a network B (corresponding to the domain B shown in FIG. 1) of the operator (certainly, the service is allowed to pass through more networks). The network A can be a synchronous digital hierarchy (SDH) network or an optical transport network (OTN), and the network A provides a layer 2 (L2) access service. The network B may be a data network including only a router, and the network B provides a layer 3 switching service.

Therefore, in a scenario shown in FIG. 1, for the customer, a port 1 and a port 2 are access points of a layer 3 service. However, for the operator, the virtual leased line (VLL) needs to be configured for the network A; therefore, the port 1 and the port 2 are access points of a layer 2 service. An access point of a layer 2 service and an access point of a layer 3 service have different configurations. The access point of the layer 2 service needs to be configured with a layer 2 parameter such as a value of a virtual local area network (VLAN), and the access point of the layer 3 service needs to be configured with a layer 3 parameter such as IP/route.

At present, a management model and a related solution of an end-to-end cross-domain and cross-technology VPN service are lacked in the industry, resulting in segment-by-segment management by the operator. For example, in the scenario shown in FIG. 1, the operator first needs to coordinate resources (including coordinating port resources: ports 1, 2, 3, 4, 5, 6, and 7) of the network A and the network B, deploys a VLL1.1 and a VLL1.2 in the network A, then deploys an L3VPN1.3 in the network B, and ensures that VLAN values allocated to the ports 3, 4, 5, and 6 are matched. IP addresses and routing protocols allocated to the ports 5 and 6 need to correspond to both a port of the site 1 and a port b of the site 2.

Therefore, an end-to-end cross-domain and cross-technology VPN service model facilitating management by an operator and a corresponding management solution are needed.

At present, a related end-to-end VPN service model and a related management solution in the industry include the draft "draft-ltsd-l3sm-l3vpn-service-model" of the standard IETF2016/5/2. In descriptions of the standard, edge features of an L3VPN (Layer 3 VPN) are described from the perspective of a user requirement. Even though features of a, b, and c in FIG. 1 are described, for example, a geographic location of the site 1 is described, and an IP address (10.1.1.2/24) of the port a and a peer IP address (10.1.1.3/24) on an operator side are described, a network with an edge on which the peer IP address on the operator side should be deployed is not described, and a user cannot check a specific decomposition status of the VPN in each network from a model. Consequently, the user cannot learn whether service quality of the site 1 is affected by the VLL1.1, the port 3, the port 5, or the L3VPN1.3. Therefore, the model is not suitable for use by a maintenance engineer of the operator.

SUMMARY

This application provides a method and an apparatus for implementing a composed VPN, to automatically create a composed VPN service, and publish a management model of the composed VPN service to a user, so that the user can recognize a correlation between services in different domains and different technologies, and can readily estimate a range affected by a service change of the composed VPN service.

According to a first aspect, a method for implementing a composed virtual private network VPN is provided, including:

obtaining a service type and a customer site that are input by a user, where specifically, the user inputs the service type and the customer site of a composed VPN that the user requests to implement, and the composed VPN indicates a VPN service across multiple domains;

determining an access point corresponding to the customer site, where the access point corresponding to the customer site is an access point of the composed VPN that the user requests to implement;

determining one or more segment VPNs according to the service type and the access point corresponding to the customer site, where the segment VPN indicates a service connection in each of multiple domains crossed by the composed VPN;

obtaining the composed VPN according to the one or more segment VPNs, where specifically, the composed VPN requested by the user is obtained by combining the one or more segment VPNs; and outputting an access point list and a segment VPN list of the composed VPN to the user, where the access point list of the composed VPN includes information used to describe the access point of the composed VPN, the access point of the composed VPN is the access point corresponding to the customer site, and the segment VPN list includes information used to describe the one or more segment VPNs, where VPN basic information of the composed VPN may be further output to the user.

In the technical solution of this application, the one or more segment VPNs are obtained according to the service type and the customer site that are input by the user; the composed VPN is obtained by using the one or more segment VPNs; the access point list and the segment VPN list of the composed VPN are output to the user, so that the user can learn a correlation between services in different domains related to the composed VPN, and can readily estimate a range affected by a service change of the composed VPN.

With reference to the first aspect, in a first possible implementation of the first aspect, the determining one or more segment VPNs according to the service type and the access point corresponding to the customer site includes:

obtaining a composed VPN model, where the composed VPN model includes a service type option, the access point list, and the segment VPN list, and the composed VPN model is used to determine segment VPN information in the segment VPN list according to a service type input into the service type option and an access point input into the access point list, where the composed VPN model further includes the VPN basic information; and inputting the access point corresponding to the customer site into the access point list of the composed VPN model, inputting the service type into the service type option of the composed VPN model, and obtaining the one or more segment VPNs from the segment VPN list of the composed VPN model.

With reference to the first possible implementation of the first aspect, in a second possible implementation of the first aspect, the composed VPN model determines, by means of the following steps, the segment VPN information in the segment VPN list according to the service type input into the service type option and the access point input into the access point list:

determining, based on a service type library obtained by means of service orchestration, a service policy and a primary domain that correspond to the service type, where a service policy of the primary domain is the same as the service policy corresponding to the service type, the service policy is any one of the following service policies: a layer 2 L2VPN, a layer 3 L3VPN, or a termination point TP, and the service type library includes a correspondence between the service type, the service policy, and the primary domain;

determining, by using the primary domain as a target, a service access path of the access point corresponding to the customer site, where a destination node of the service access path is a boundary node of the primary domain;

determining the one or more segment VPNs according to a domain passed through by the service access path, where the segment VPN indicates a service connection in the domain passed through by the service access path, where specifically, each domain passed through by the service access path includes one segment VPN; and presenting information about the one or more segment VPNs in the segment VPN list of the composed VPN model.

In the technical solution of this application, the composed VPN model is provided. The composed VPN model includes the service type option, the access point list, and the segment VPN list. The composed VPN model is used to determine the segment VPN information in the segment VPN list according to the service type input into the service type option and the access point input into the access point list. That is, the composed VPN requested by the user can be obtained by using the composed VPN model.

With reference to the first aspect, in a third possible implementation of the first aspect, the determining one or more segment VPNs according to the service type and the access point corresponding to the customer site includes:

determining, based on a service type library obtained by means of service orchestration, a service policy and a primary domain that correspond to the service type, where a service policy of the primary domain is the same as the service policy corresponding to the service type, the service policy is any one of the following service policies: an L2VPN, an L3VPN, or a TP, and the service type library includes a correspondence between the service type, the service policy, and the primary domain;

determining, by using the primary domain as a target, a service access path of the access point corresponding to the customer site, where a destination node of the service access path is a boundary node of the primary domain; and determining the one or more segment VPNs according to a domain passed through by the service access path, where the segment VPN indicates a service connection in the domain passed through by the service access path.

Specifically, each domain passed through by the service access path includes one segment VPN.

With reference to the second or the third possible implementation of the first aspect, in a fourth possible implementation of the first aspect, the determining, by using the primary domain as a target, a service access path of the access point corresponding to the customer site includes:

determining an access domain of the access point corresponding to the customer site, where the access domain is a domain in which the access point is located;

determining an inter-domain routing path from the access domain to the primary domain;

allocating port resources to domains passed through by the inter-domain routing path, and determining a service connection between ports allocated to the domains; and determining the service access path of the access point corresponding to the customer site according to the port resources allocated to the domains and the service connection between the ports allocated to the domains.

With reference to the second to the fourth possible implementations of the first aspect, in a fifth possible implementation of the first aspect, the method further includes:

obtaining a parameter of the composed VPN that needs to be modified;

when the parameter needing to be modified is a management status parameter, where a management status is an active state or an inactive state, determining a target segment VPN in which the access point of the composed VPN is located, and sending the parameter needing to be modified to a domain controller of a domain in which the target segment VPN is located, so that the domain controller modifies, according to the parameter needing to be modified, an access point corresponding to the target segment VPN; and when the parameter needing to be modified includes a layer parameter, searching for a port that is at a same layer as the parameter needing to be modified and that is on the service access path of the access point corresponding to the customer site, and correspondingly modifying the found port according to the parameter needing to be modified, where the layer parameter includes a layer 2 parameter or a layer 3 parameter.

By means of the technical solution of the present application, an operator can efficiently and flexibly modify the composed VPN.

With reference to the second to the fifth possible implementations of the first aspect, in a sixth possible implementation of the first aspect, the method further includes:

determining that a target customer site of the composed VPN needs to be deleted; and searching for a service access path of an access point corresponding to the target customer site, and deleting all objects on the service access path of the access point corresponding to the target customer site.

Specifically, all objects on a service access path include a port and a service connection on the service access path.

By means of the technical solution of this application, the operator can efficiently and flexibly modify the composed VPN.

With reference to the second to the sixth possible implementations of the first aspect, in a seventh possible implementation of the first aspect, the method further includes:

determining that the composed VPN needs to be deleted; and deleting all the segment VPNs of the composed VPN.

By means of the technical solution of this application, the operator can efficiently and flexibly modify the composed VPN.

With reference to the first aspect and the foregoing possible implementations of the first aspect, in an eighth possible implementation of the first aspect, a service policy of the composed VPN is a first service policy, a service policy of a segment VPN in which a first access point in the access point of the composed VPN is located is a second service policy, a parameter of the first access point includes a parameter at a composed VPN layer and a parameter at a segment VPN layer, the parameter at the composed VPN layer includes a parameter corresponding to the first service policy, and the parameter at the segment VPN layer includes a parameter corresponding to the second service policy.

In the technical solution of this application, a parameter of the access point of the composed VPN uses a hierarchical expression scheme, and may express configuration information at different service layers at the same time. Specifically, the access point list of the composed VPN includes a parameter of the access point at the composed VPN layer. An access point list of a segment VPN in which the access point is located includes a parameter of the access point at the segment VPN layer. The access point list and the segment VPN list of the composed VPN are output to the user (an operator), and the segment VPN list includes an access point list of the segment VPN. Therefore, the operator can learn both the parameter of the access point of the composed VPN at the composed VPN layer (that is, a layer seen by the customer) and the parameter of the access point of the composed VPN at the segment VPN layer, and can readily manage the composed VPN.

With reference to the eighth possible implementation of the first aspect, in a ninth possible implementation of the first aspect, when the service policy is the L3VPN, a parameter corresponding to the service policy includes a layer 2 parameter and a layer 3 parameter;

when the service policy is the L2VPN, a parameter corresponding to the service policy includes only a layer 2 parameter; or when the service policy is the TP, a parameter corresponding to the service policy includes a broadband service-related parameter.

With reference to the first aspect and the foregoing possible implementations of the first aspect, in a tenth possible implementation of the first aspect, the method further includes:

after outputting the access point list, the segment VPN list, and the VPN basic information of the composed VPN to the user, sending a configuration message of each segment VPN to a domain controller of a domain in which the segment VPN is located if a confirmation response of the user is received, so that the domain controller instructs a corresponding network element device to create the segment VPN.

In the technical solution of this application, the configuration message of the corresponding segment VPN is delivered to the controller, so that the controller instructs the corresponding network element device to create the corresponding segment VPN. Multiple segment VPNs included in the composed VPN are created, so as to create the composed VPN.

With reference to the first aspect and the foregoing possible implementations of the first aspect, in an eleventh possible implementation of the first aspect, the access point list includes the following information: configuration information of a PE device and configuration information of a CE device that correspond to the access point of the composed VPN, and further includes route configuration information of the access point; and the segment VPN list includes the following information: access point information and basic information of the segment VPN.

According to a second aspect, an apparatus for implementing a composed virtual private network VPN is provided. The apparatus is configured to perform the method in the first aspect or any possible implementation of the first aspect.

Specifically, the apparatus may include modules configured to perform the method in the first aspect or any possible implementation of the first aspect.

According to a third aspect, an apparatus for implementing a composed virtual private network VPN is provided. The apparatus includes a memory and a processor. The memory is configured to store an instruction. The processor is configured to execute the instruction stored in the memory. The processor executes the instruction stored in the memory, so as to perform the method in the first aspect or any possible implementation of the first aspect.

In the foregoing implementations, the segment VPN is a service connection deployed in a domain.

In the foregoing implementations, the composed VPN is a service connection deployed in a management domain across one or more domains. A composed VPN includes one or more segment VPNs. A segment VPN included in a composed VPN includes at least one segment VPN (also referred to as a primary domain VPN) whose service policy is the same as a service policy of the composed VPN.

In the foregoing implementations, the service policy of the composed VPN or the segment VPN includes the L3VPN, the L2VPN, or the TP.

Based on the foregoing technical solutions, in this application, the one or more segment VPNs are obtained according to the service type and the customer site that are input by the user; the composed VPN is obtained by using the one or more segment VPNs; the access point list and the segment VPN list of the composed VPN are output to the user, so that the user can learn a correlation between services in different domains related to the composed VPN, and can readily estimate a range affected by a service change of the composed VPN.

DESCRIPTION OF EMBODIMENTS

The following describes the embodiments of the present application with reference to the accompanying drawings.

Figure 1:
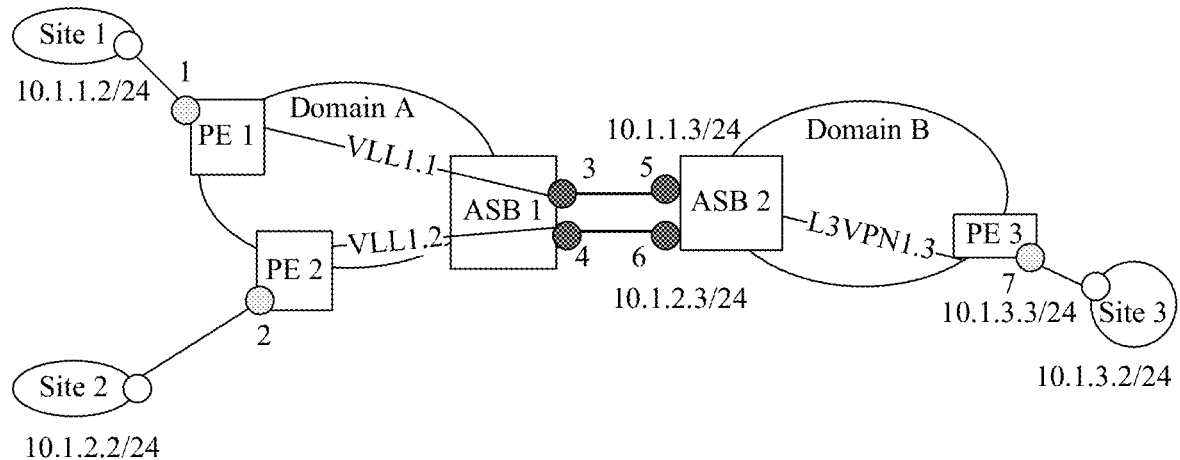
FIG. 1 is a schematic diagram of an application scenario according to an embodiment of the present application.

This application provides a method for implementing a composed VPN, an orchestrator, and a controller for lack of a management solution of an end-to-end cross-domain and cross-technology VPN service in the industry, so that a user can learn a correlation between services in different domains related to a composed VPN, and can readily estimate a range affected by a service change of the composed VPN. For example, in a scenario shown in FIG. 1, the method provided in this application can automatically complete resource allocation and service combination between different sub-networks. For example, a VLL1.1, a VLL1.2, and an L3VPN1.3 in FIG. 1 are associated into a same VPN service.

For ease of understanding and describing the method provided in the embodiments of the present application, concepts possibly related to the embodiments of the present application are first introduced below.

Sometimes, many departments of a large office are distributed in some locations that are relatively far away from each other, and each location has a private network of the location. Assuming that the private networks distributed in different locations often need to communicate with each other, a private network of the office may be implemented by means of Internet (that is, public Internet). Therefore, the private network is referred to as a virtual private network (VPN). The VPN is a virtual private network provided by an operator for a user by means of a public network of the operator. That is, the VPN is a private network of the user from the perspective of the user. For the operator, the public network includes a public backbone network and a public operator boundary device. VPN member sites that are geographically separated from each other are connected to corresponding operator boundary devices by using client devices, and form VPNs of users by means of the public network of the operator.

At present, a basic model of a typical VPN includes three parts: a CE device, a PE device, and a P device.

The CE device is a customer edge device, and is an edge device on a customer side. The CE device has an interface directly connected to a service provider (SP) network. The CE device may be a router or a switch, or may be a host. Usually, the CE device cannot "sense" existence of the VPN, and does not need to have a VPN function.

The PE device is a provider edge device, and is an edge device of the service provider network. The PE device is directly connected to the CE device, and is responsible for VPN service access. One PE device may be connected to multiple CE devices. Alternatively, one CE device may be connected to multiple PE devices belonging to a same service provider network or different service provider networks.

The P device is a backbone device in the service provider network, and is not directly connected to the CE device.

A site is an IP system with IP-connectivity in between, and the IP-connectivity of the IP system does not need to be implemented by means of the service provider network. Sites are divided based on a network topological relationship of devices rather than a geographic location even though geographic locations of devices in a site are usually neighboring. If two IP systems whose geographic locations are separated from each other are interconnected by means of a private line without performing interworking by using a service provider network, the two IP systems form a site. The site is connected to the service provider network by using the CE device.

After the VPN emerges, the VPN is divided into two branches: an L2VPN and an L3VPN in the communications field. The L2VPN is a layer 2 VPN, and the L3VPN is a layer 3 VPN.

The L2VPN has a close relationship with a layer 2 (that is, a data link layer, L2) of a 7-layer structure. The L2VPN means that a tunnel forming a VPN is encapsulated at the data link layer, and a customer maps a layer 3 route of the customer to a network of the data link layer. For an MPLS L2VPN, after a data packet accesses the network, a layer 2 header of the data packet is re-encapsulated, and MPLS header information is added. Layer 2 switching is performed by using a pre-created tunnel (a transmission tunnel), to transmit the data packet to a destination site by site.

An Ethernet private line (EPL) and a virtual leased line (VLL) are widely applied as point-to-point virtual private line technologies by an operator, and are used to provide an L2VPN service for a customer.

The L3VPN has a close relationship with a layer 3 (that is, a network layer, also referred to as an IP layer, L3 for short) of the 7-layer structure. The L3VPN is a VPN solution based on a routing scheme. IP packet-based forwarding is performed in a manner similar to conventional routing. After receiving an IP data packet, a router searches a forwarding table for a destination address of the IP data packet, and then performs cross-operator backbone transmission of IP data by using a pre-established label switched path (LSP).

For a cross-domain VPN, customer sites of a VPN service need to be deployed in different autonomous systems (AS). Therefore, the VPN needs to be deployed across multiple AS domains. This type of the VPN established across domains is referred to as a cross-domain VPN service. In the embodiments of the present application, the cross-domain VPN is referred to as a composed VPN. In the embodiments of the present application, for ease of differentiation and description, a composed VPN and a segment VPN are used for description, and different names do not constitute any limitation to the protection scope of the embodiments of the present application.

The segment VPN (SegVPN) is a VPN deployed in a segment. It needs to be noted that the "segment" mentioned in this specification indicates a "domain", for example, an autonomous system (AS) domain. That is, the segment VPN may be understood as a VPN deployed in an AS domain.

The composed VPN is a VPN deployed across one or more segments (for example, AS domains). The composed VPN includes one or more segment VPNs.

The segment VPN describes an instance of an atomic service of decomposing the composed VPN into each domain. The atomic service is a minimum service granularity that can be recognized and managed by a domain controller. That is, the segment VPN includes only one type of service rather than multiple types of services.

For ease of understanding the composed VPN, the segment VPN, and a relationship between the two by a person in the art, a related description is provided below with reference to FIG. 2.

Figure 2:
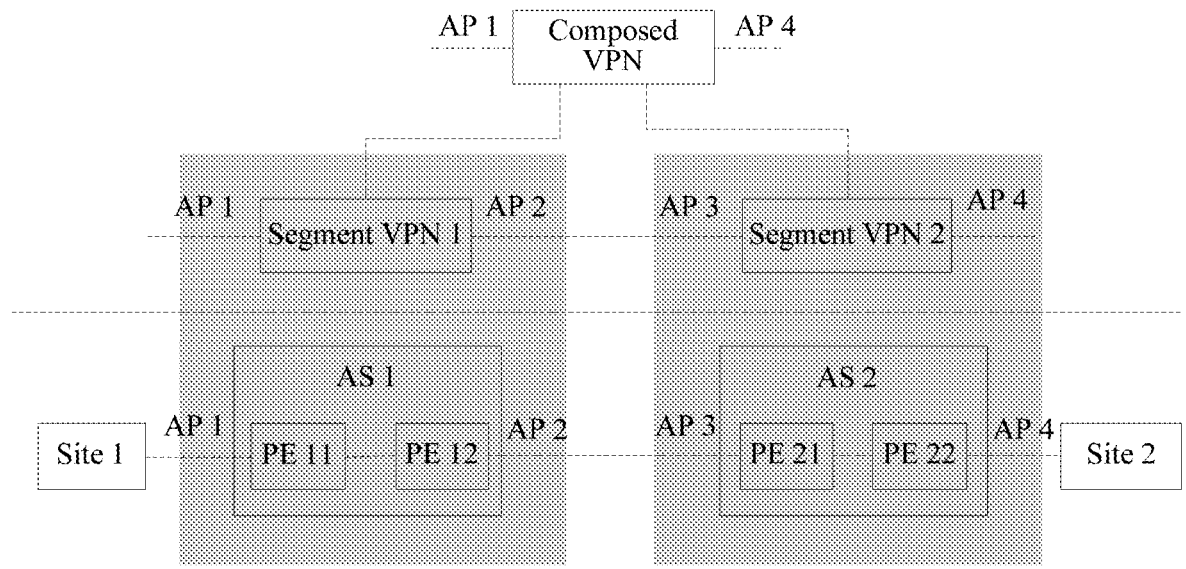
FIG. 2 is a schematic diagram of a composed VPN and segment VPNs according to an embodiment of the present application.

A composed VPN shown in FIG. 2 is a VPN of VPN member sites: a site 1 and a site 2 that are geographically separated from each other. The composed VPN crosses an AS 1 and an AS 2. The site 1 is connected to a PE 11 in the AS 1 by using an access point (AP) 1, and the site 2 is connected to a PE 22 in the AS 2 by using an AP 4. An inter-domain connection mode for the AS 1 and the AS 2 is: a PE 12 in the AS 1 is connected to a PE 21 by using an AP 2 and an AP3. It should be understood that the AP 1 is a port of the PE 11, the AP 2 is a port of the PE 12, the AP 3 is a port of the PE 21, and the AP 4 is a port of the PE 22.

A service connection (AP 1-AP 2) in the AS 1 is a segment VPN of the composed VPN, and a service connection (AP 3-AP 4) in the AS 2 is another segment VPN of the composed VPN. That is, in a scenario of FIG. 2, the composed VPN includes a segment VPN 1 and a segment VPN 2.

In FIG. 2, the site 1 and the site 2 are customer sites of the composed VPN. An access point of the site 1 is the AP 1, and an access point of the site 2 is the AP 4. Access points of the composed VPN include the AP 1 and the AP 4. Access points of the segment VPN 1 include the AP 1 and the AP 2. Access points of the segment VPN 2 include the AP 3 and the AP 4.

In FIG. 2, specifically, from the perspective of a customer, the composed VPN may be an L2VPN or an L3VPN. That is, a service policy of the composed VPN may be the L2VPN or the L3VPN. Only one of the segment VPNs included in the composed VPN needs to have a same service policy as the composed VPN, and a remaining segment VPN may have a different service policy. For example, when the composed VPN is the L3VPN, the segment VPN 1 is the L3VPN, and the segment VPN 2 is the L2VPN. Alternatively, the segment VPN 1 is the L3VPN, and the segment VPN 2 is the L3VPN.

It should be understood that in FIG. 2, the PE 12 is specifically implemented by an autonomous system boundary router (ASBR) of the AS 1, and the PE 21 is implemented by an autonomous system boundary router of the AS 2.

A segment VPN forming a composed VPN needs to include a primary domain VPN. The primary domain VPN is a segment VPN having a same service policy as the composed VPN. In other words, the primary domain VPN is a segment VPN implementing a service feature of the composed VPN.

In this embodiment of the present application, the service policy of the composed VPN may be the L2VPN, the L3VPN, or a termination point (TP). In this embodiment of the present application, the TP is a port, and the port may be used to indicate an access port of a cross-domain broadband remote access server (BRAS) service. It should be understood that a BRAS is a novel broadband network application-oriented access gateway. The BRAS is located on an edge layer of a backbone network, and can implement data access to an IN/ATM network of user bandwidth and implement an application such as broadband network access of inhabitants in a commercial building or a community and an IP VPN service based on the Internet Protocol Security (IPSec). That the service policy of the composed VPN is the TP means that the service policy of the composed VPN is of a broadband service type, for example, a service based on the Dynamic Host Configuration Protocol (DHCP).

When the service policy of the composed VPN is the L3VPN, a service policy of at least one of the segment VPNs included in the composed VPN is the L3VPN, and a service policy of the remaining segment VPN may be any one of the L3VPN, the L2VPN, or the TP.

When the service policy of the composed VPN is the L2VPN, a service policy of at least one of the segment VPNs included in the composed VPN is the L2VPN, and a service policy of the remaining segment VPN may be any one of the L3VPN, the L2VPN, or the TP.

When the service policy of the composed VPN is the TP, a service policy of at least one of the segment VPNs included in the composed VPN is the TP, and a service policy of the remaining segment VPN may be any one of the L3VPN, the L2VPN, or the TP.

It needs to be noted that in this embodiment of the present application, L3 indicates a layer 3, that is, a network layer, which may also be described as an IP layer, of a 7-layer network. Therefore, L3, the network layer, and the IP layer that are mentioned in this specification all have a same meaning. L2 indicates a layer 2, that is, a data link layer, which may also be described as an Ethernet layer, of the 7-layer network. Therefore, L2, the data link layer, and the Ethernet layer that are mentioned in this specification all have a same meaning.

Figure 3:
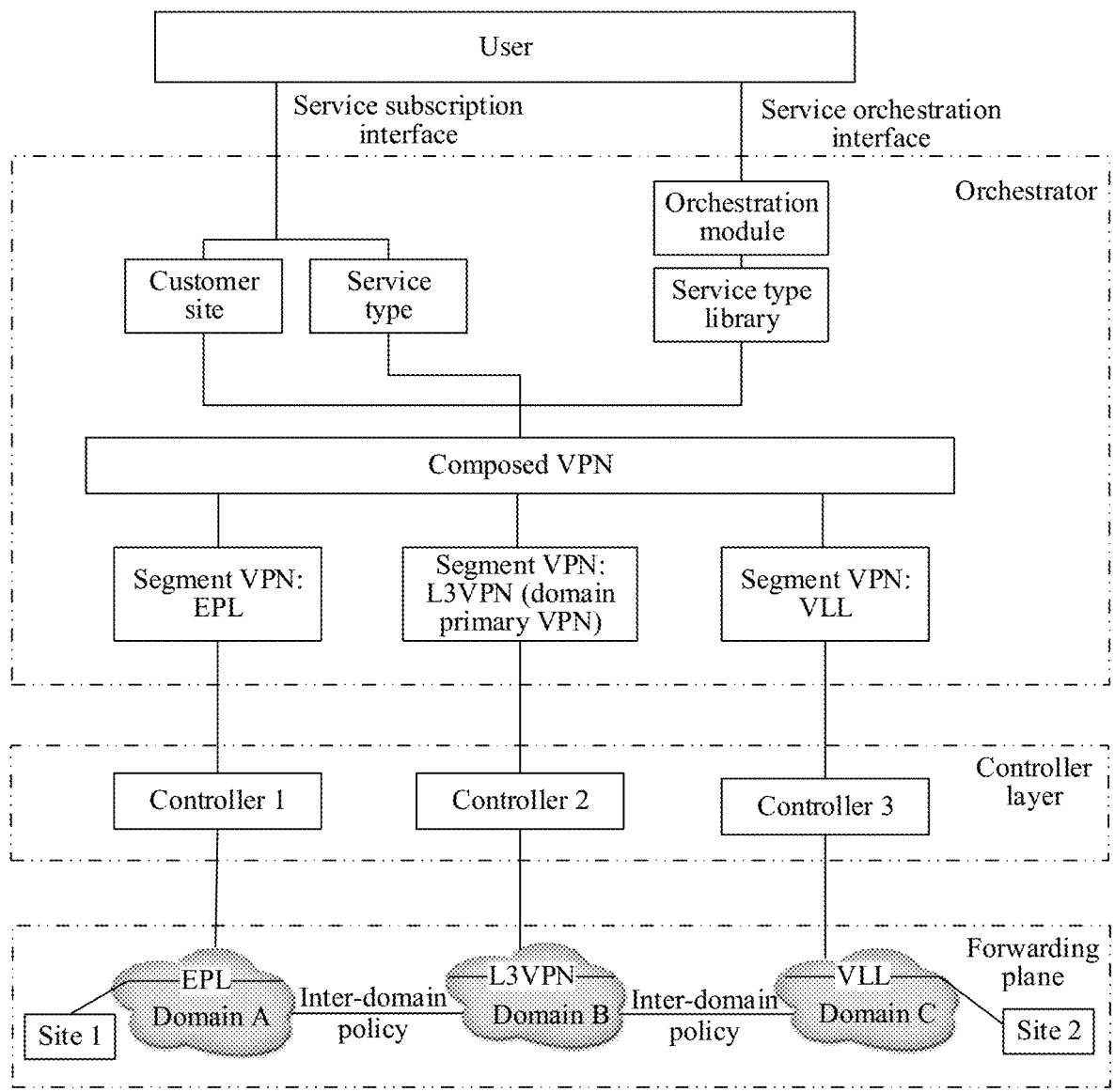
FIG. 3 is a schematic diagram of a system architecture according to an embodiment of the present application.

FIG. 3 is a schematic diagram of a system architectural according to an embodiment of the present application. An entire network includes three layers: an orchestrator, a controller layer, and a forwarding plane. The forwarding plane may be a router network or an optical transport network (OTN). The orchestrator is interconnected with a controller by using a Restful/Netconf interface. The controller and the router layer communicate with each other by using a Netconf/Cli/Snmp interface.

The orchestrator provides a service orchestration interface and a service subscription interface by means of a Restful protocol. The orchestrator includes an orchestration module, configured to: perform service orchestration according to information that is input by a service planning personnel (corresponding to a user in FIG. 3) by using the service orchestration interface, to obtain a service type template, and store the obtained service type template in a service type library. A key account manager (corresponding to the user in FIG. 3) selects, by using the service subscription interface, a name (or an identifier) of a service type needing to be subscribed. An operator may further input information about a customer site by using the service subscription interface. The orchestrator determines, according to the customer site input by the user (the user in this specification is the operator), an access point corresponding to the customer site, and then determines, according to the access point corresponding to the customer site and the service type input by the user, a composed VPN required by the user. The composed VPN includes multiple segment VPNs. For example, the customer site is a site 1 and a site 2 shown in FIG. 3, and the composed VPN determined by the orchestrator crosses a domain A, a domain B, and a domain C. A service policy of the domain A is an EPL, a service policy of the domain B is an L3VPN, and a service policy of the domain C is a VLL. The composed VPN includes three segment VPNs: an EPL, an L3VPN, and a VLL.

The orchestrator delivers configuration messages of the segment VPNs to the controller by using the Restful/Netconf interface. The controller instructs, by using the Netconf/Cli/Snmp interface, the forwarding plane to create the corresponding segment VPNs. For example, the orchestrator delivers a configuration message of the segment VPN: the EPL to a controller 1, and the controller 1 instructs a network element in the domain A to create the segment VPN: the EPL. The orchestrator delivers a configuration message of the segment VPN: the L3VPN to a controller 2, and the controller 2 instructs a network element in the domain B to create the segment VPN: the L3VPN. The orchestrator delivers a configuration message of the segment VPN: the VLL to a controller 3, and the controller 3 instructs a network element in the domain C to create the segment VPN: the VLL. It should be understood that in FIG. 3, the controller 1 is a domain controller of the domain A, the controller 2 is a domain controller of the domain B, and the controller 3 is a domain controller of the domain C.

Figure 4:
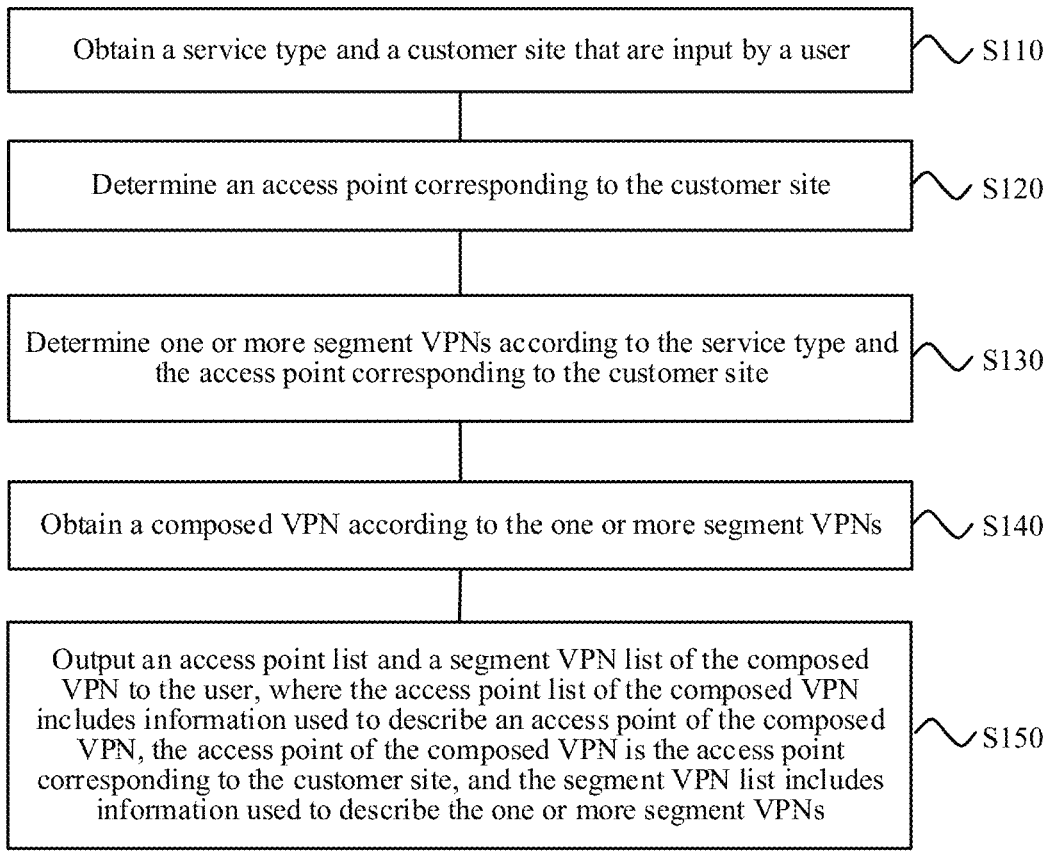
FIG. 4 is a schematic flowchart of a method for implementing a composed VPN according to an embodiment of the present application.

FIG. 4 is a schematic flowchart of a method 100 for implementing a composed VPN according to an embodiment of the present application. The method 100 may be performed by the orchestrator shown in FIG. 3. The method 100 includes the following steps:

S110: Obtain a service type and a customer site that are input by a user.

Specifically, the service type and the customer site that are input by the user and that are of a composed VPN that the user requests to implement are obtained. The composed VPN indicates a VPN service across multiple domains.

S120: Determine an access point corresponding to the customer site.

Specifically, the access point corresponding to the customer site is a corresponding access point through which the customer site accesses a composed VPN network. As shown in FIG. 1, an access point of a site 1 is a port 1. As shown in FIG. 2, an access point of a site 1 is an AP 1.

The access point corresponding to the customer site may also be referred to as an access point of the composed VPN that the user requests to implement.

S130: Determine one or more segment VPNs according to the service type and the access point corresponding to the customer site.

The segment VPN indicates a service connection in each of multiple domains crossed by the composed VPN.

S140: Obtain a composed VPN according to the one or more segment VPNs.

S150: Output an access point list and a segment VPN list of the composed VPN to the user, where the access point list of the composed VPN includes information used to describe an access point of the composed VPN, the access point of the composed VPN is the access point corresponding to the customer site, and the segment VPN list includes information used to describe the one or more segment VPNs.

Specifically, VPN basic information of the composed VPN may be further output to the user.

Specifically, the access point list includes the following information: configuration information of a PE device and configuration information of a CE device that correspond to the access point of the composed VPN, and further includes route configuration information of the access point. The segment VPN list includes the following information: access point information and basic information of the segment VPN of the composed VPN. The VPN basic information includes the following information: a VPN identifier, a VPN name, and a service policy of the composed VPN service. The service policy includes an L2VPN, an L3VPN, or a broadband service.

In this embodiment of the present application, the access point list, the segment VPN list, and the VPN basic information of the composed VPN are output to the user according to the service type and the customer site that are input by the user and that are of the composed VPN to be implemented, so that the user can learn a correlation between services in different domains related to the composed VPN, and can readily estimate a range affected by a service change of the composed VPN.

Figure 5:
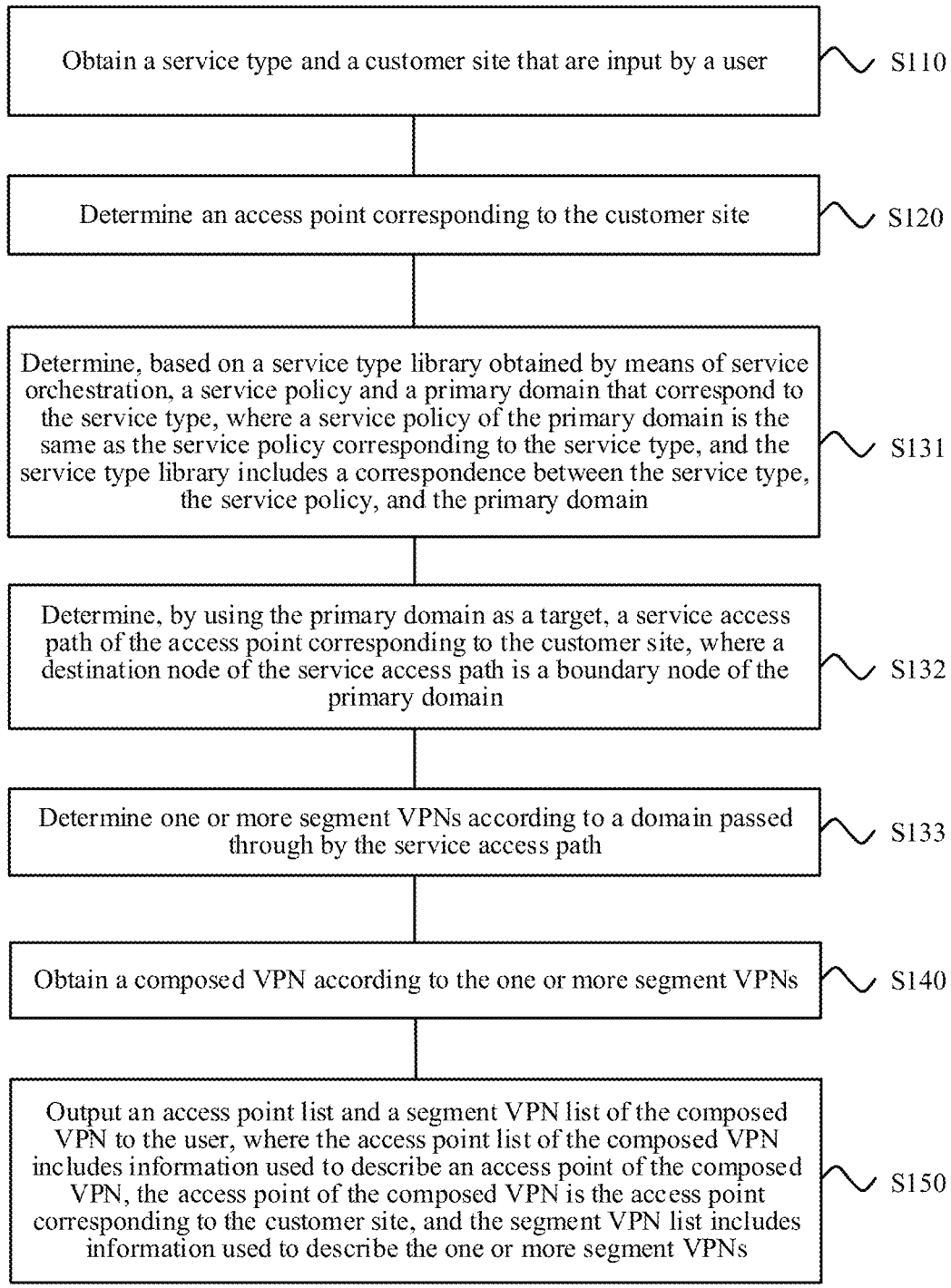
FIG. 5 is another schematic flowchart of a method for implementing a composed VPN according to an embodiment of the present application.

Optionally, FIG. 5 is another schematic flowchart of a method for implementing a composed VPN according to an embodiment of the present application. In this embodiment of the present application, the determining one or more segment VPNs according to the service type and the access point corresponding to the customer site in S130 includes:

S131: Determine, based on a service type library obtained by means of service orchestration, a service policy and a primary domain that correspond to the service type, where a service policy of the primary domain is the same as the service policy corresponding to the service type, the service policy is any one of the following service policies: an L2VPN, an L3VPN, or a TP, and the service type library includes a correspondence between the service type, the service policy, and the primary domain.

Figure 6:
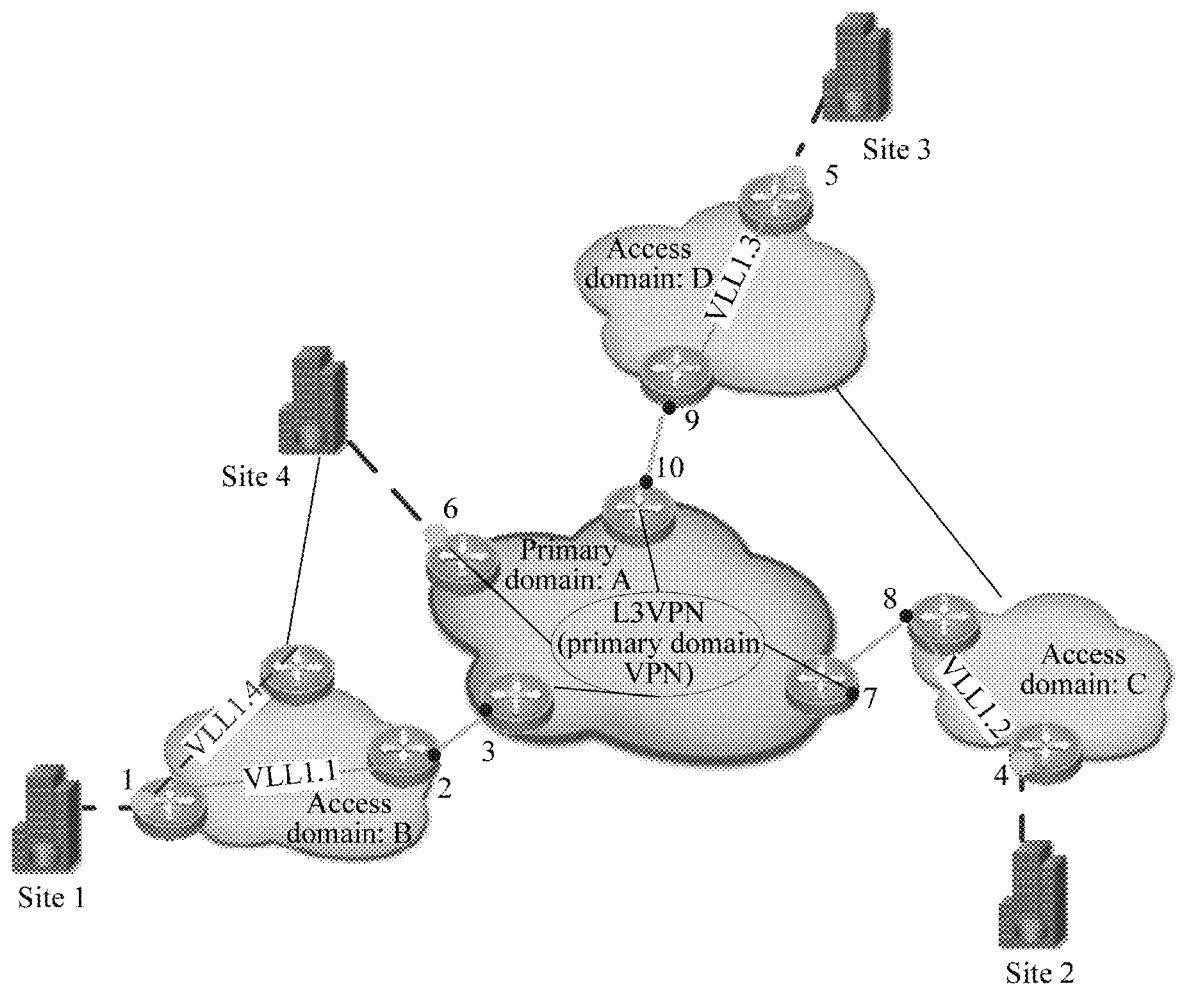
FIG. 6 is another schematic flowchart of a method for implementing a composed VPN according to an embodiment of the present application.

A domain in which a primary-domain VPN is located is referred to as the primary domain. The primary domain is designated according to the service type during the service orchestration. Different service types may have different primary domains. The primary-domain VPN is a single-domain service carrying a service feature of the composed VPN. The primary-domain VPN is also referred to as a primary-domain service policy. A single-domain service policy in single-domain service policies is designated as the primary-domain service policy at a service definition stage (that is, a service orchestration stage). A domain in which the primary-domain service policy is located is the primary domain. As shown in FIG. 6, FIG. 6 shows a fullmesh L3VPN enterprise private line service. At the service definition stage, when the fullmesh L3VPN enterprise private line service is decomposed into single-domain service policies, a domain A needs to be designated as a primary domain, and an atomic service form of the domain A is a fullmesh L3VPN.

It should be understood that the service orchestration means using a service as a resource, and orchestrating an attribute (that is, an attribute of the service) and an instance policy (for example, a resource selection policy) of the resource as a template for delivery.

A service type template obtained by means of the service orchestration includes information about the service policy, and specifically includes a composed service policy and a single-domain service policy (one or more single-domain service policies). The single-domain service policy needs to include a single-domain service policy the same as the composed service policy, and the single-domain service policy is set to the primary-domain service policy. A domain in which the primary-domain service policy is located is referred to as the primary domain, that is, a primary domain of a service type corresponding to the service type template.

Each service type template obtained by means of the service orchestration corresponds to one unique service type identifier. That is, each service type template corresponds to one service type. That is, the service type library storing the service type template includes a correspondence between a service type identifier and a service type template. If a service type is specified, a service type template corresponding to the service type can be determined.

It needs to be noted that in this embodiment of the present application, the service orchestration is considered to be completed. For example, in a scenario shown in FIG. 6, regardless of whether the customer site and the service type that are input by the user are received, it is already known that a service policy of a domain A is an L3VPN, and service policies of a domain B, a domain C, and a domain D are VLLs. In addition, for that a service policy of the composed VPN is the L3VPN, the domain A is designated as the primary domain of the composed VPN.

Specifically, as shown in FIG. 6, assuming that the service policy of the composed VPN is the L3VPN, in the domains A, B, C, and D shown in FIG. 6, the domain A is the primary domain of the composed VPN.

In this embodiment of the present application, when a service access path of the customer site is determined, the determining is performed by using the primary domain as a target rather than directly searching for a path from a tenant site to the customer site.

S132: Determine, by using the primary domain as a target, a service access path of the access point corresponding to the customer site, where a destination node of the service access path is a boundary node of the primary domain.

The service access path indicates an inter-domain path from the customer site to the primary domain.

Specifically, the determining, by using the primary domain as a target, a service access path of the access point corresponding to the customer site in S132 includes:

determining an access domain of the access point corresponding to the customer site, where the access domain is a domain in which the access point is located;

determining an inter-domain routing path from the access domain to the primary domain;

allocating port resources to domains passed through by the inter-domain routing path, and determining a service connection between ports allocated to the domains; and determining the service access path of the access point corresponding to the customer site according to the port resources allocated to the domains and the service connection between the ports allocated to the domains.

Specifically, FIG. 6 is still used as an example. For example, if a service access path of an access point 1 of a customer site site 1 needs to be determined, an access domain B of the access point 1 is first determined, and then inter-domain routing (B-A) from the access domain B to the primary domain A is performed. A port 3 is allocated to the domain B, and a service connection VLL1.1 is defined between a port 1 and the port 3. The port 3 is allocated to the domain A, an inter-domain connection policy from the port 2 to the port 3 is established, and a service connection L3VPN is defined on the port 3 allocated to the domain A. Hereto, the service access path: 1-VLL1.1-2-3 of the access point 1 is determined. Based on a similar method, a service access path: 4-VLL1.2-8-7 of an access point 4 of a customer site site 2, a service access path: 5-VLL1.3-9-10 of an access point 5 of a customer site site 3, and a service access path: 6 of an access point 6 of a customer site site 4 may be determined.

It needs to be noted that in this embodiment of the present application, the service access path of the access point of the customer site may also be referred to as a service access path of the customer site. A service access path of a customer site that appears in the following is a service access path of an access point of the customer site.

S133: Determine the one or more segment VPNs according to a domain passed through by the service access path.

Specifically, the segment VPN indicates a service connection in the domain passed through by the service access path. In other words, each domain passed through by the service access path includes at least one segment VPN.

It may be vividly understood that the domain passed through by the service access path of the access point is decomposed into the segment VPN.

Specifically, as shown in FIG. 6, the service access path (1-VLL1.1-2-3) of the access point 1 of the customer site site 1 passes through the domain B, and a service connection of the service access path in the domain B is a VLL1.1. Therefore, one segment VPN of the composed VPN is a segment VPN: the VLL1.1. The service access path (4-VLL1.2-8-7) of the access point 4 of the customer site site 2 passes through the domain C, and a service connection of the service access path in the domain C is a VLL1.2. Therefore, another segment VPN of the composed VPN is a segment VPN: the VLL1.2. The service access path (5-VLL1.3-9-10) of the access point 5 of the customer site site 3 passes through the domain D, and a service connection of the service access path in the domain D is a VLL1.3. Therefore, still another segment VPN of the composed VPN is a segment VPN: the VLL1.3. The access point 6 of the customer site site 4 is directly connected to the primary domain A, and the service access path of the access point 6 does not pass through another domain. The L3VPN in the primary domain A is also a segment VPN of the composed VPN. Hereto, the four segment VPNs: the L3VPN, the VLL1.1, the VLL1.2, and the VLL1.3 of the composed VPN are obtained.

It can be learned from the foregoing that a primary domain VPN of the composed VPN may also be understood as a segment VPN implementing a service feature of the composed VPN.

In this embodiment of the present application, the primary domain of the composed VPN is determined according to the service type that is input by the user and that is of the composed VPN to be implemented. Then the service access path of the access point of the composed VPN is obtained according to the primary domain. The segment VPN of the composed VPN is determined according to the domain passed through by the service access path.

In S150, an access point list, a segment VPN list, and VPN basic information of the composed VPN are output to the user. The access point list of the composed VPN includes information used to describe the access point of the composed VPN, and the access point of the composed VPN is the access point corresponding to the customer site. The segment VPN list includes information used to describe the one or more segment VPNs.

Specifically, the access point list includes the following information: configuration information of a PE device and configuration information of a CE device that correspond to the access point of the composed VPN, and further includes route configuration information of the access point. The segment VPN list includes the following information: access point information and basic information of the segment VPN of the composed VPN. The VPN basic information includes the following information: a VPN identifier, a VPN name, and a service policy of the composed VPN service. The service policy includes an L2VPN, an L3VPN, or a broadband service.

Still using FIG. 6 as an example, the access point list of the composed VPN that is output to the user includes: a CE device and a PE device that correspond to the port 1, and route information of the port 1; a CE device and a PE device that correspond to a port 4, and route information of the port 4; a CE device and a PE device that correspond to a port 5, and route information of the port 5; and a CE device and a PE device that correspond to a port 6, and route information of the port 6.

The segment VPN list of the composed VPN that is output to the user includes: an access point list (related information of the port 1 and the port 2) and basic information of the segment VPN: the VLL1.1; an access point list (related information of the port 4 and a port 8) and basic information of the segment VPN: the VLL1.2; an access point list (related information of the port 5 and a port 9) and basic information of the segment VPN: the VLL1.3; and an access point list (related information of the port 3, the port 6, a port 7, and a port 10) and basic information of the segment VPN: the L3VPN.

The VPN basic information of the composed VPN that is output to the user includes: a VPN identifier (VPN ID) of the composed VPN, a VPN name of the composed VPN, and the service policy L3VPN of the composed VPN.

Based on the foregoing embodiment, optionally, in an embodiment, the determining one or more segment VPNs according to the service type and the access point corresponding to the customer site in S130 includes:

obtaining a composed VPN model 200, where the composed VPN model 200 includes a service type option, the access point list, and the segment VPN list, and the composed VPN model is used to determine segment VPN information in the segment VPN list according to a service type input into the service type option and an access point input into the access point list, where specifically, the composed VPN model 200 further includes VPN basic information; and inputting the access point corresponding to the customer site into the access point list of the composed VPN model, inputting the service type into the service type option of the composed VPN model, and obtaining the one or more segment VPNs from the segment VPN list of the composed VPN model.

Optionally, in this embodiment of the present application, the composed VPN model 200 determines, by means of the following steps, the segment VPN information in the segment VPN list according to the service type input into the service type option and the access point input into the access point list:

determining, based on a service type library obtained by means of service orchestration, a service policy and a primary domain that correspond to the service type, where a service policy of the primary domain is the same as the service policy corresponding to the service type, the service policy is any one of the following service policies: a layer 2 L2VPN, a layer 3 L3VPN, or a termination point TP, and the service type library includes a correspondence between the service type, the service policy, and the primary domain;

determining, by using the primary domain as a target, a service access path of the access point corresponding to the customer site, where a destination node of the service access path is a boundary node of the primary domain;

determining the one or more segment VPNs according to a domain passed through by the service access path, where the segment VPN indicates a service connection in the domain passed through by the service access path; and presenting information about the one or more segment VPNs in the segment VPN list of the composed VPN model.

For a specific description, refer to the foregoing description in S133, and details are not described herein again.

Figure 7:
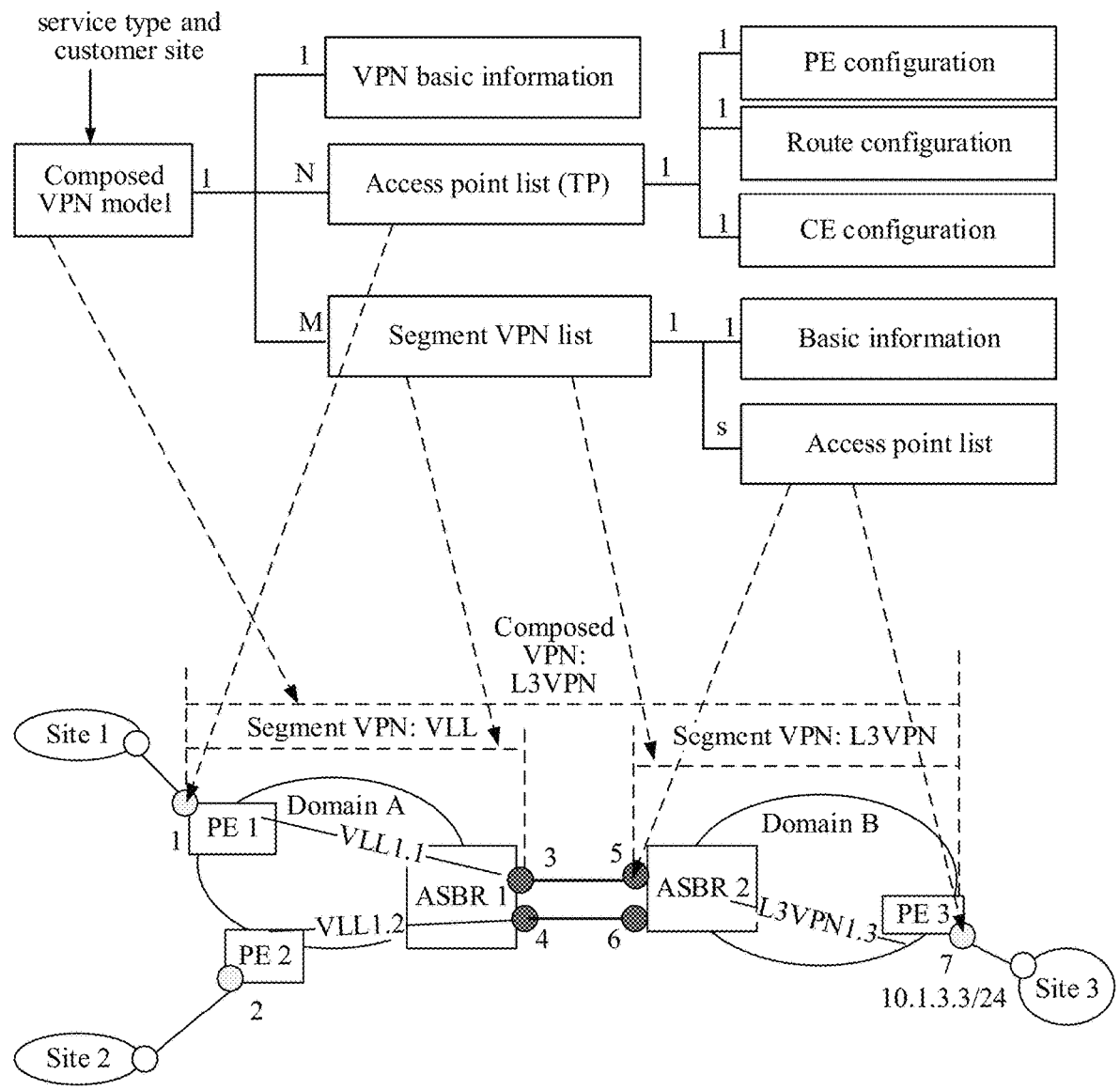
FIG. 7 is a schematic diagram of a composed VPN model according to an embodiment of the present application.

Specifically, as shown in FIG. 7, the composed VPN model 200 includes the service type (not shown in FIG. 7), the VPN basic information, the segment VPN list, and the access point list.

The service type is used to associate the composed VPN to a service type template (obtained by means of service orchestration).

The VPN basic information includes information used to describe a basic attribute of the composed VPN. For example, the VPN basic information includes: a VPN identifier (VPN ID) used to uniquely identify the composed VPN, a VPN name (VPN Name) of the composed VPN, the service policy (L3VPN/L2VPN/TP) of the composed VPN, and the like.

The access point list includes information used to describe the access point of the composed VPN. First, the access point list herein is an access point list of the composed VPN, and is different from an access point list that is of the segment VPN and that is mentioned below. For example, in a network shown in FIG. 7, the access point list of the composed VPN includes information used to describe a port 1, a port 2, and a port 7. Second, specifically, as shown in FIG. 7, the information used to describe the access point of the composed VPN includes the following information: configuration information (for example, a VLAN or an IP) of a PE device corresponding to the access point, configuration information (for example, a physical address, an IP, or a name of a CE device) of a CE device corresponding to the access point, and route configuration information (for example, a BGP or an AS number) of the access point.

The segment VPN list includes basic VPN information and an access point list. The basic VPN information is used to describe what the segment VPN looks like and how the segment VPN communicates with a device outside the segment VPN. The access point list in the segment VPN list is used to describe an access point that connects the segment VPN to the customer site or an access point that connects the segment VPN to another segment VPN.

The composed VPN model further includes some global information (not shown in FIG. 7), specifically, for example, information such as a customer identifier (a composed ID) used to associate the composed VPN with a private customer, or a topology or a service type of the composed VPN.

As an example rather than a limitation, a working principle of the composed VPN model is described below with reference to FIG. 7.

An orchestrator determines the access point of the composed VPN, which may also be referred to as a boundary point at a top layer of the composed VPN, according to the customer site input by the user. The top layer herein is actually a composed VPN layer. Then, a parameter of the access point of the composed VPN is input into the access point list (at the composed VPN layer) of the composed VPN model. The parameter of the access point of the composed VPN may also be referred to as a top-layer boundary parameter of the composed VPN. The orchestrator inputs, into the service type (option) of the composed VPN model, the service type input by the user. The composed VPN model calculates service access paths of all access points of the composed VPN according to the top-layer boundary parameter of the composed VPN that is input into the access point list and the input service type, and obtains segment VPNs of the composed VPN by means of decomposition according to domains passed through by the service access paths. Then, the basic information and the access point list of the segment VPN are presented in the segment VPN list.

In this embodiment of the present application, the composed VPN model is provided. The composed VPN model may output the segment VPN information and the VPN basic information of the composed VPN according to the input service type of the composed VPN and the access point information. The access point list, the segment VPN list, and the VPN basic information of the composed VPN are output to the user, so that the user can learn a correlation between services in different domains related to the composed VPN, and can readily estimate a range affected by a service change of the composed VPN.

Optionally, in this embodiment of the present application, a service policy of the composed VPN is a first service policy, a service policy of a segment VPN in which a first access point in the access point of the composed VPN is located is a second service policy, a parameter of the first access point includes a parameter at a composed VPN layer and a parameter at a segment VPN layer, the parameter at the composed VPN layer includes a parameter corresponding to the first service policy, and the parameter at the segment VPN layer includes a parameter corresponding to the second service policy.

When the service policy is the L3VPN, a parameter corresponding to the service policy includes a layer 2 parameter and a layer 3 parameter.

When the service policy is the L2VPN, a parameter corresponding to the service policy includes only a layer 2 parameter.

When the service policy is the TP, a parameter corresponding to the service policy includes a broadband service-related parameter, for example, a DHCP parameter. The foregoing description is applicable to the service policy of the composed VPN and a service policy of the segment VPN.

It should be understood that an IP layer parameter includes parameters such as a routing protocol and an IP address. An Ethernet layer parameter includes parameters such as a MAC address and a VLAN.

Specifically, in this embodiment of the present application, the access point of the composed VPN is hierarchically expressed. For example, in FIG. 7, the composed VPN is an L3VPN. Therefore, an access point 1 (that is, the port 1) needs to be configured with a layer 2 parameter (a VLAN) and a layer 3 parameter (a routing protocol, an IP address, or the like) at the composed VPN layer. However, a service decomposition policy of the composed VPN in a domain A is a VLL. Therefore, the access point 1 can only be configured with a layer 2 parameter at the segment VPN (that is, a VLL1.1) layer. For the layer 3 parameter, an interface, that is, a port 5, whose single-domain service policy is the L3VPN needs to be searched for along a service access path 1-VLL1.1-3-5 of the access point 1. Then, the layer 3 parameter of the access point 1 is configured on the port 5 along the service access path 1-VLL1.1-3-5 of the access point 1. At the segment VPN layer, the port 1 and the port 3 are layer 2 ports, and the port 5 is a layer 3 port.

In this embodiment of the present application, the parameter of the access point of the composed VPN uses a hierarchical expression scheme, and may express configuration information at different service layers at the same time. Specifically, the access point list of the composed VPN includes a parameter of the access point at the composed VPN layer. An access point list of a segment VPN in which the access point is located includes a parameter of the access point at the segment VPN layer. The access point list and the segment VPN list of the composed VPN are output to the user (an operator), and the segment VPN list includes an access point list of the segment VPN. Therefore, the operator can learn both the parameter of the access point of the composed VPN at the composed VPN layer (that is, a layer seen by the customer) and the parameter of the access point of the composed VPN at the segment VPN layer, and can readily manage the composed VPN.

Based on the foregoing embodiments, in this embodiment, the method 100 further includes:

after outputting the access point list, the segment VPN list, and VPN basic information of the composed VPN to the user, sending a configuration message of each segment VPN to a domain controller of a domain in which the segment VPN is located if a confirmation response of the user is received, so that the domain controller instructs a corresponding network element device to create the segment VPN.

For a specific description, refer to the foregoing description of instructing, by the orchestrator, the controller to create the segment VPN with reference to FIG. 3, and details are not described herein again.

In this embodiment of the present application, the configuration message of the corresponding segment VPN is delivered to the controller, so that the controller instructs the corresponding network element device to create the corresponding segment VPN. Multiple segment VPNs included in the composed VPN are created, so as to create the composed VPN.

In conclusion, this embodiment of the present application provides a method for implementing a composed VPN, so as to efficiently implement an end-to-end cross-domain and cross-technology VPN service, and provides a concept that a composed VPN includes one or more segment VPNs. The segment VPN of the composed VPN is published to a user, so that the user can learn a correlation between services in different domains related to the composed VPN, and can readily estimate a range affected by a service change of the composed VPN. In addition, this embodiment of the present application further provides a concept of a composed VPN model, so as to better facilitate automatic management of the composed VPN by an operator.

In the prior art, in a process of maintaining, by an operator, a cross-domain and cross-technology VPN shown in FIG. 1, if a branch site 1 needs to be deleted, the operator first needs to find a service connection VLL1.1 correspondingly allocated to the site 1 in a network A, and deletes the service connection VLL1.1. In addition, the operator needs to apply to a network B for modifying a related parameter. In this case, a management personnel of the network B needs to check which port, that is, a port 5, in the network B serves the site 1, and then deletes the port 5. The site deletion process includes many procedures and lots of manual processing. Consequently, service provision and management are error-prone.

In this embodiment of the present application, a CRUD operation on a customer site of a composed VPN is performed based on a service access path of an access point of the customer site. CRUD means create, data retrieve, update, and delete. In comparison to the prior art, efficiency of managing the composed VPN by an operator can be improved, and management costs can be reduced.

A procedure of performing a CRUD operation on a composed VPN according to an embodiment of the present application is described below with reference to FIG. 8 to FIG. 11.

Figure 8:
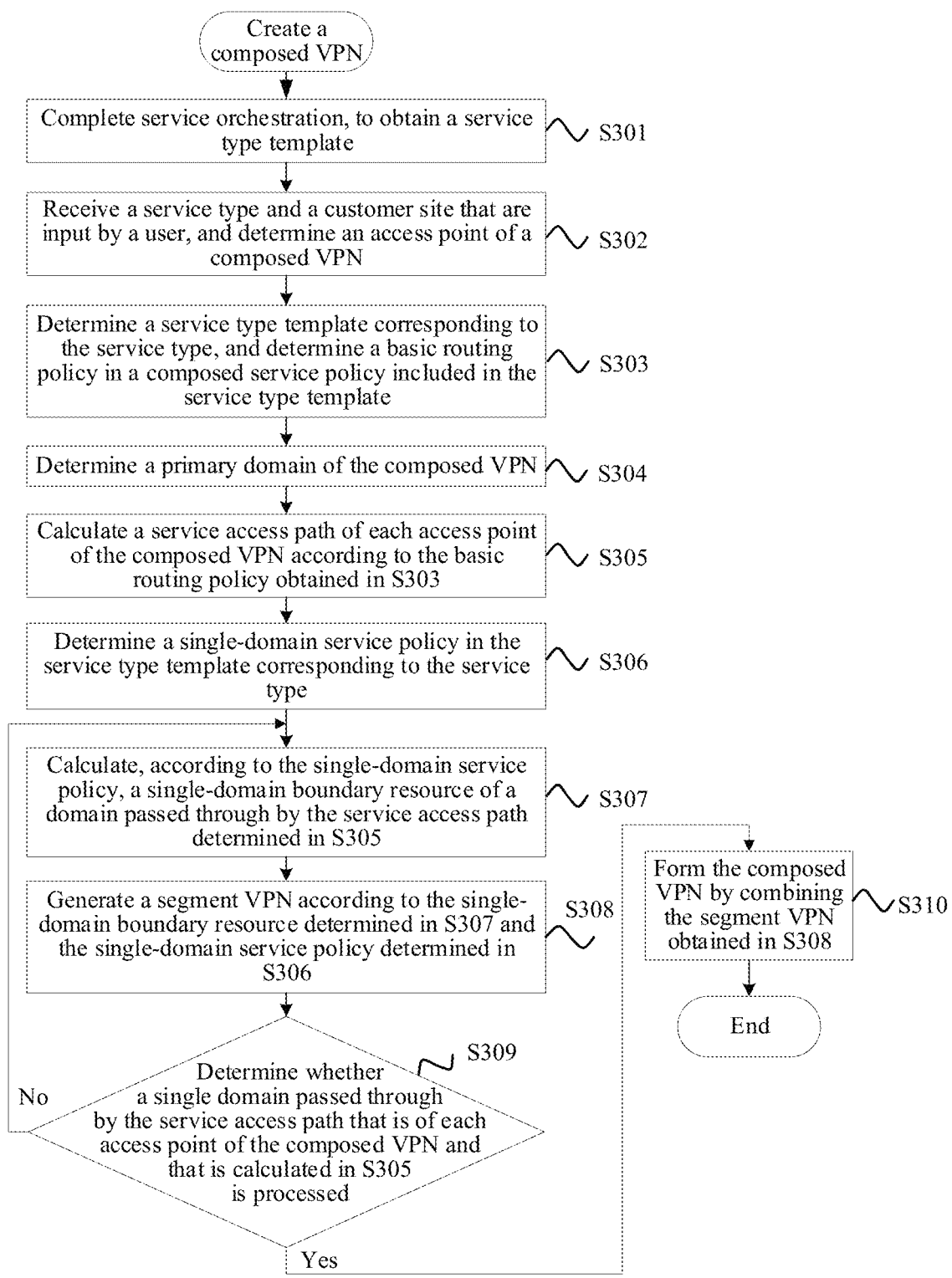
FIG. 8 is a schematic flowchart of creating a composed VPN according to an embodiment of the present application.

FIG. 8 is a schematic flowchart of a method 300 for creating a composed VPN according to an embodiment of the present application. The method 300 may be performed by the orchestrator shown in FIG. 3. The method 300 includes the following steps.

S301: Complete service orchestration, to obtain a service type template.

It should be understood that the service orchestration means using a service as a resource, and orchestrating an attribute (that is, an attribute of the service) and an instance policy (for example, a resource selection policy) of the resource as a template for delivery.

Specifically, the orchestrator completes the service orchestration by using a Restful interface. The service orchestration is performed according to information input by a service planning personnel (corresponding to the user in FIG. 3) by using a service orchestration interface, to obtain the service type template, and the obtained service type template is stored in a service type library of the orchestrator.

The service type template obtained by means of the service orchestration includes information about a service policy, and specifically includes a composed service policy and a single-domain service policy (one or more single-domain service policies). The single-domain service policy needs to include a single-domain service policy the same as the composed service policy, and the single-domain service policy is set to a primary-domain service policy. A domain in which the primary-domain service policy is located is referred to as a primary domain, that is, a primary domain of a service type corresponding to the service type template.

Each service type template obtained by means of the service orchestration corresponds to one unique service type identifier. That is, each service type template corresponds to one service type. That is, the service type library storing the service type template includes a correspondence between a service type identifier and a service type template. If a service type is specified, a service type template corresponding to the service type can be determined.

S302: Receive a service type and a customer site that are input by a user, determine an access point corresponding to the customer site, that is, determine an access point of a composed VPN, and further determine a parameter of the access point according to the service type.

Specifically, a service type template corresponding to the service type input by the user is determined based on the service type library obtained by means of the service orchestration in S301, and a service policy of the composed VPN is determined according to the service type template.

The parameter of the access point of the composed VPN is determined according to the service policy of the composed VPN. For example, when the service policy of the composed VPN is an L3VPN, the parameter of the access point (a rate layer is a layer 3) of the composed VPN includes an IP layer parameter and an Ethernet layer parameter. When the service policy of the composed VPN is an L2VPN, the parameter of the access point (a rate layer is a layer 2) of the composed VPN includes only an Ethernet layer parameter.

It should be understood that the user may input a service type identifier. The orchestrator determines, according to the service type identifier, the service type selected by the user.

S303: Determine a service type template corresponding to the service type in S302, and determine a basic routing policy in a composed service policy included in the service type template.

The service type template corresponding to the service type input by the user is determined based on the service type library obtained by means of the service orchestration in S301. The service type template includes the composed service policy and a single-domain service policy. An end-to-end "routing policy" is obtained from the composed service policy. The end-to-end "routing policy" describes an end-to-end cross-domain basic routing algorithm policy, for example, a shortest path algorithm, or a shortest delay algorithm.

S304: Determine a primary domain of the composed VPN.

It can be learned from the foregoing that during the service orchestration, a service type template corresponding to each service type defines a primary domain of the service type.

Specifically, the service type template is obtained according to the service type in S302. The service type template includes the composed service policy and single-domain service policies. A single-domain service policy set to a primary domain service policy is found from all the single-domain service policies in the service type template. A domain corresponding to the primary domain service policy is the primary domain of the composed VPN.

S305: Calculate a service access path of each access point of the composed VPN according to the basic routing policy obtained in S303.

Specifically, a service access path of an access point is an inter-domain path from the access point to the primary domain that is of the composed VPN and that is obtained in S304.

Optionally, in this embodiment of the present application, an access domain in which the access point is located may be obtained according to a domain in which a network element corresponding to the access point is located. According to a domain defined in a single-domain service policy, the domain is abstracted as a point and an inter-domain connection is abstracted as a line. An inter-domain path from the access domain to the primary domain, that is, the service access path of the access point of the composed VPN, is calculated according to the basic routing policy.

S306: Determine a single-domain service policy in the service type template corresponding to the service type in S302.

S307: Calculate, according to the single-domain service policy obtained in S306, a single-domain boundary resource of a domain passed through by the service access path determined in S305, where the single-domain boundary resource includes a port, a VLAN, an IP, an RD/RT address, or the like.

Specifically, a single-domain resource pool is obtained according to the single-domain service policy obtained in S306. An inter-domain peer port (which is also an access port of a segment VPN), the VLAN, the IP, and the RD/RT address are selected according to the single-domain resource pool, to obtain the single-domain boundary resource of the domain passed through by the service access path determined in S305.

Optionally, an inter-domain RD/RT address may be selected according to the single-domain resource pool. When a domain controller of a single domain can automatically allocate an RD/RT of the domain, the orchestrator may not allocate the inter-domain RD/RT address.

S308: Generate a segment VPN according to the single-domain boundary resource that is of the domain passed through by the service access path and that is determined in S307 and the single-domain service policy determined in S306.

Specifically, a service connection, for example, a VLL or an L3VPN, in the single domain passed through by the service access path is determined according to the single-domain service policy, to obtain the segment VPN corresponding to the service access path. In addition, a default parameter in the corresponding single-domain service policy is in basic information of the segment VPN.

It should be understood that boundary information of the segment VPN may be delivered to a controller, to request for detailed routing in a corresponding domain, so as to obtain more specific information of the segment VPN.

S309: Determine whether a single domain passed through by the service access path that is of each access point of the composed VPN and that is calculated in S305 is processed, and if the single domain passed through by the service access path that is of each access point of the composed VPN and that is calculated in S305 is processed, go to S310, or if the single domain passed through by the service access path that is of each access point of the composed VPN and that is calculated in S305 is not processed, go to S307.

S310: Form the composed VPN by combining the segment VPN obtained in S308.

Specifically, as shown in FIG. 2, a segment VPN 1 and a segment VPN 2 are obtained by means of S301 to S309, and then the segment VPN 1 and the segment VPN 2 are combined to form the composed VPN.

In this embodiment of the present application, after the composed VPN is created, a management model of the composed VPN may be published to the user.

Specifically, the management model of the composed VPN that is published to the user is as the composed VPN model shown in FIG. 7.

Specifically, the composed VPN model includes: VPN basic information, an access point list, and a segment VPN list.

The VPN basic information includes: a network topology, the service type, and a management status. The network topology is, for example, Fullmesh or Hub-Spoke. The service type is, for example, an enterprise private network or an enterprise network access service. The management status is a management status parameter, where a management status is an active state or an inactive state.

The access point list includes a parameter used to describe the access point of the composed VPN.

Specifically, the access point list includes the following parameters of the access point of the composed VPN: an identifier (ID), a working layer, a layer parameter list, and a CE side port served by the access point. The identifier (ID) is used to uniquely identify the access point. The working layer is used to indicate a working layer, for example, an Ethernet layer (a layer 2) or an IP layer (a layer 3) of the access port. The layer parameter list includes a layer parameter of the access port. When the working layer is an Ethernet layer, the layer parameter list includes an Ethernet parameter. When the working layer is an IP layer, the layer parameter list includes an IP parameter.

The layer parameter of the access point of the composed VPN is determined according to the service policy of the composed VPN. For specific content, refer to the foregoing related description, and details are not described herein again.

The segment VPN list is also referred to as a single-domain VPN service list. The segment VPN list includes multiple single-domain VPN services, and has only one primary-domain VPN service.

Specifically, the segment VPN list includes the following information: a port ID, a segment VPN type, a segment VPN role, and segment VPN information. The port ID is an ID of a port of the segment VPN. The segment VPN type is used to indicate a service connection type of the segment VPN. The segment VPN type includes a VPN and a port (TP). For example, when the service connection type of the segment VPN is an L3VPN or an L2VPN, it is considered that the segment VPN type is the VPN. When the service connection type of the segment VPN is a broadband service, it is considered that the segment VPN type is the port (TP). The segment VPN role is used to indicate whether the segment VPN is a primary domain VPN. For the segment VPN information, when the segment VPN type is the VPN, the segment VPN information is a VPN structure. When the segment VPN type is the port, the segment VPN information is a TP structure. When the segment VPN information is the VPN structure, the VPN structure includes an access point list of the segment VPN.

The composed VPN model may further include an identifier (ID) of the composed VPN, used to uniquely identify the composed VPN, and further include a service type identifier (ID) of the composed VPN, used to identify a service identity of the composed VPN.

Based on the foregoing embodiment, in this embodiment, after the management model of the composed VPN is published to the user, and a confirmation response of the user is received, configuration information of each segment VPN is delivered to a domain controller of a domain in which the corresponding segment VPN is located, so that the domain controller instructs a network element in a forwarding plane to create the corresponding segment VPN. For a specific description, refer to the foregoing description with reference to FIG. 7, and details are not described herein again.

Based on the foregoing embodiment, in this embodiment, the method 100 further includes:

obtaining a parameter of the composed VPN that needs to be modified;

when the parameter needing to be modified is a management status parameter, where a management status is an active state or an inactive state, determining a target segment VPN in which the access point of the composed VPN is located, and sending the parameter needing to be modified to a domain controller of a domain in which the target segment VPN is located, so that the domain controller modifies, according to the parameter needing to be modified, an access point corresponding to the target segment VPN; and when the parameter needing to be modified includes a layer parameter, searching for a port that is at a same layer as the parameter needing to be modified and that is on the service access path of the access point corresponding to the customer site, and correspondingly modifying the found port according to the parameter needing to be modified, where the layer parameter includes a layer 2 parameter or a layer 3 parameter.

Figure 9:
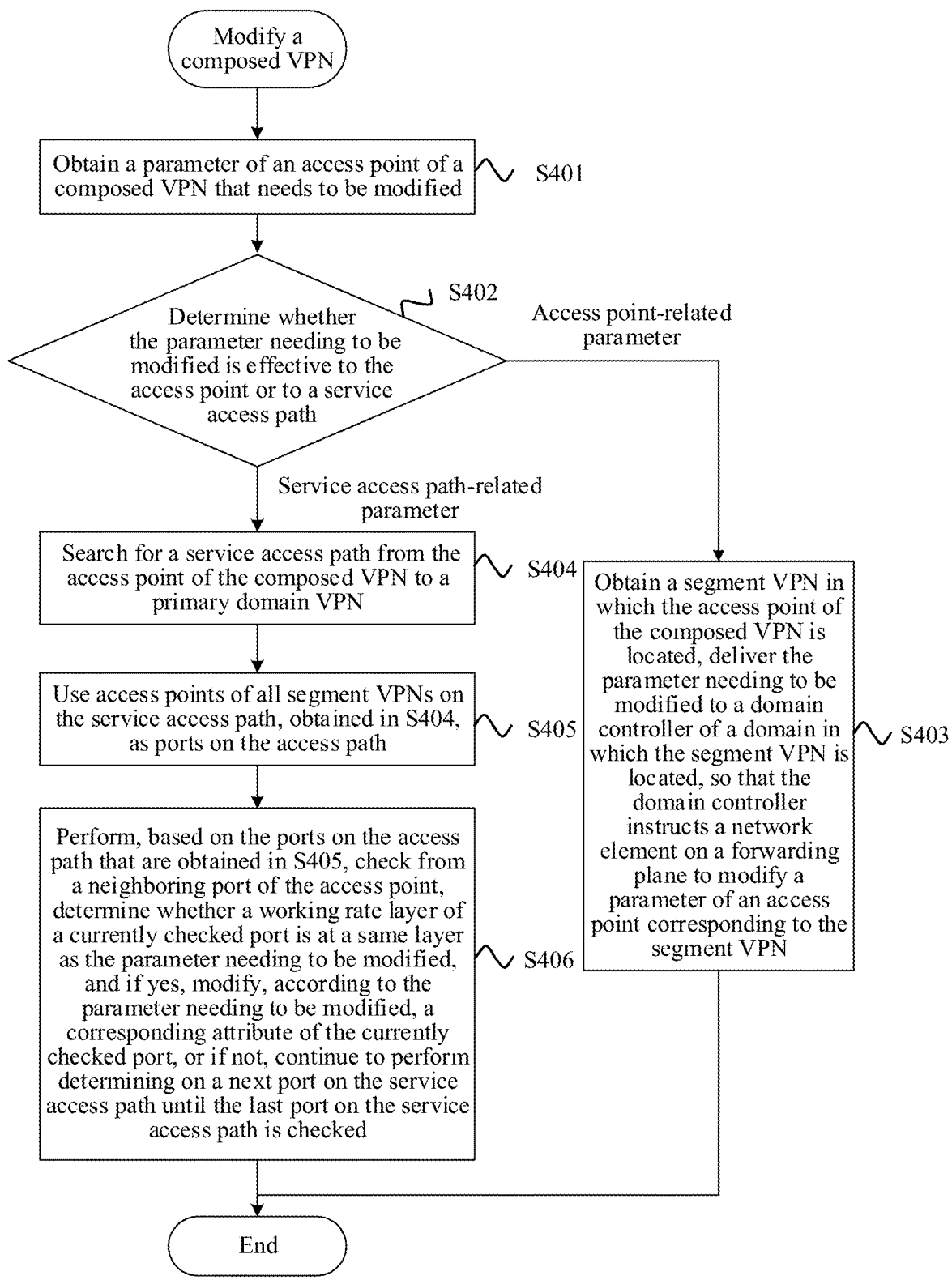
FIG. 9 is a schematic flowchart of modifying a composed VPN according to an embodiment of the present application.

Specifically, as shown in FIG. 9, FIG. 9 is a schematic flowchart of a method 400 for modifying a composed VPN according to an embodiment of the present application. The method 400 may be performed by the orchestrator shown in FIG. 3. The method 400 includes the following steps.

S401: Obtain a parameter of an access point of a composed VPN that needs to be modified.

S402: Determine whether the parameter needing to be modified is effective to the access point or to a service access path; and if the parameter needing to be modified is effective to the access point, go to S403, or if the parameter needing to be modified is effective to the service access path, go to S404.

Specifically, if the parameter needing to be modified is activation or deactivation, it is considered that the parameter needing to be modified is effective to the access point. If the parameter needing to be modified is a layer parameter, for example, an Ethernet layer parameter or an IP layer parameter, it is considered that the parameter needing to be modified is effective to the service access path.

S403: Obtain a target segment VPN in which the access point of the composed VPN is located, deliver the parameter needing to be modified to a domain controller of a domain in which the target segment VPN is located, so that the domain controller instructs a network element on a forwarding plane to modify a parameter of an access point corresponding to the target segment VPN.

S404: Search for a service access path from the access point of the composed VPN to a primary domain VPN.

Specifically, a segment VPN in which the access point of the composed VPN is located is determined; a peer access point of the access point in the segment VPN is searched for according to an access point list of the segment VPN; and a direct port in the peer access point is obtained. A segment VPN in which the direct port is located is a next segment VPN on the service access path. The step is repeated until a found segment VPN is the primary domain VPN. All ports and segment VPNs that are passed through in the foregoing process is the service access path from the access point to the primary domain VPN.

S405: Use access points of all segment VPNs on the service access path, obtained in S404, as ports on the access path.

S406: Perform, based on the ports on the access path that are obtained in S405, check from a neighboring port of the access point, determine whether a working rate layer of a currently checked port is at a same layer as the parameter needing to be modified, and if the working rate layer of the currently checked port is at the same layer as the parameter needing to be modified, modify, according to the parameter needing to be modified, a corresponding attribute of the currently checked port, or if the working rate layer of the currently checked port is at a different layer from the parameter needing to be modified, continue to perform determining on a next port on the service access path until the last port on the service access path is checked.

Based on the foregoing embodiment, in this embodiment of the present application, when a customer site is to be deleted, a service access path of the customer site to be deleted is found, and the deletion is performed segment by segment according to segment VPNs passed through by the service access path.

Based on the foregoing embodiment, in this embodiment, the method 100 further includes:

determining that a target customer site of the composed VPN needs to be deleted; and searching for a service access path of an access point corresponding to the target customer site, and deleting all objects on the service access path of the access point corresponding to the target customer site.

Specifically, all the objects on the service access path include a port and a service connection on the service access path.

Figure 10:
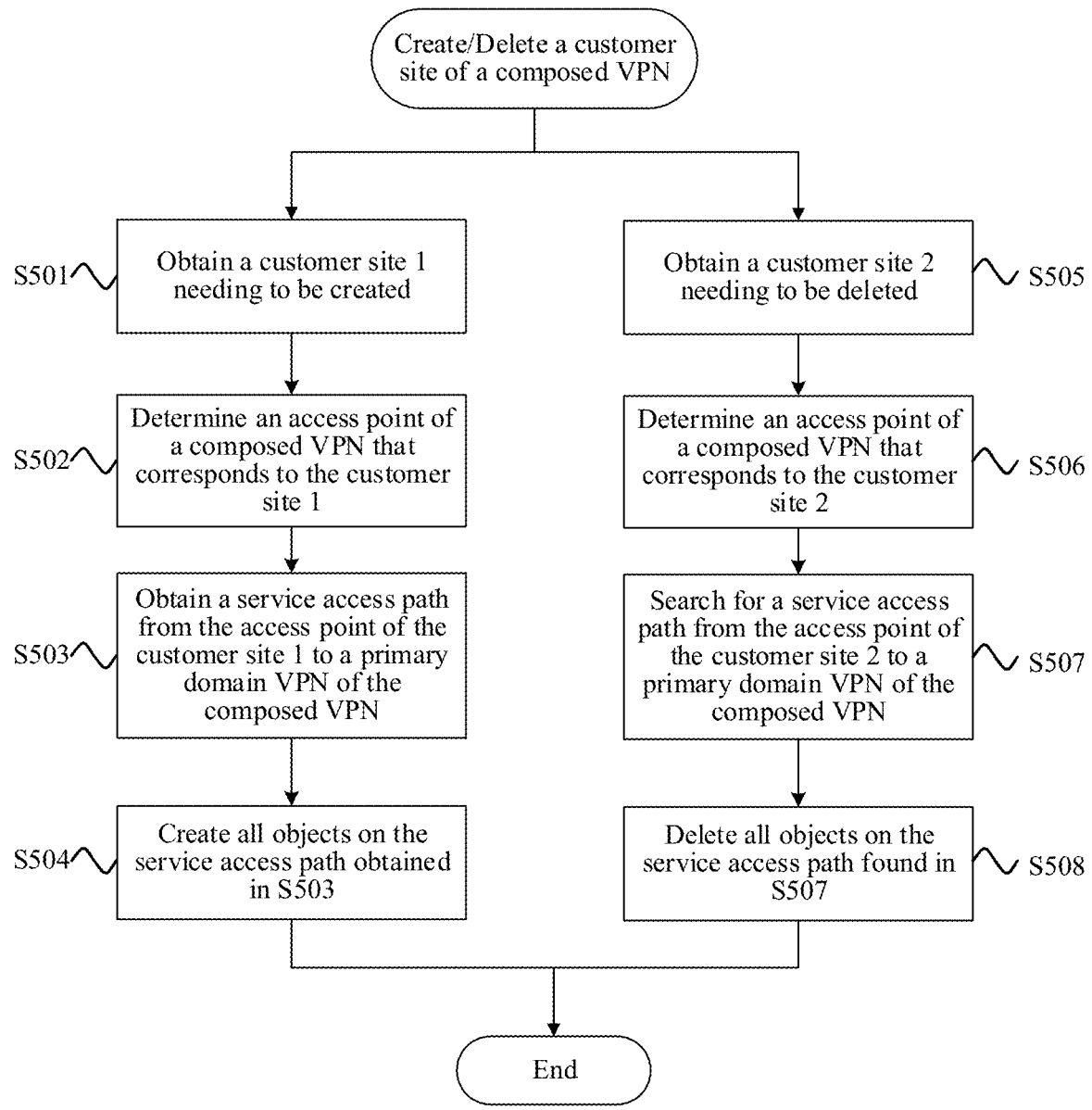
FIG. 10 is a schematic flowchart of creating/deleting a customer site of a composed VPN according to an embodiment of the present application.

Specifically, as shown in FIG. 10, FIG. 10 is a schematic flowchart of a method 500 for creating/deleting a customer site of a composed VPN according to an embodiment of the present application. The method 500 may be performed by the orchestrator shown in FIG. 3. The method 500 includes the following steps.

S501: Obtain a customer site 1 needing to be created.

The customer site 1 is a CE side site of a composed VPN.

S502: Determine an access point of a composed VPN that corresponds to the customer site 1.

The access point of the composed VPN includes a peerCeTP. When the peerCeTP equals to the input CE side site, this port is an access point corresponding to a CE.

S503: Obtain a service access path from the access point of the customer site 1 to a primary domain VPN of the composed VPN.

S504: Create all objects on the service access path obtained in S503.

Specifically, a port and a segment VPN on the service access path obtained in S503 are created.

S505: Obtain a customer site 2 needing to be deleted.

S506: Determine an access point of a composed VPN that corresponds to the customer site 2.

S507: Search for a service access path from the access point of the customer site 2 to a primary domain VPN of the composed VPN.

For specific content, refer to the description in S404. For brevity, details are not described herein again.

S508: Delete all objects on the service access path found in S507.

Specifically, as shown in FIG. 7, if the site 1 needs to be deleted, and a service access path of the site 1 is 1-VLL1.1-3-5, the port 1, the port 3, and a service connection VLL1.1 between the port 1 and the port 3 need to be deleted. In addition, the port 5 in a primary domain B needs to be deleted, but a service connection L3VPN in the primary domain B is not deleted.

Based on the foregoing embodiment, in this embodiment, the method 100 further includes:

determining that the composed VPN needs to be deleted; and deleting all the segment VPNs of the composed VPN.

Figure 11:
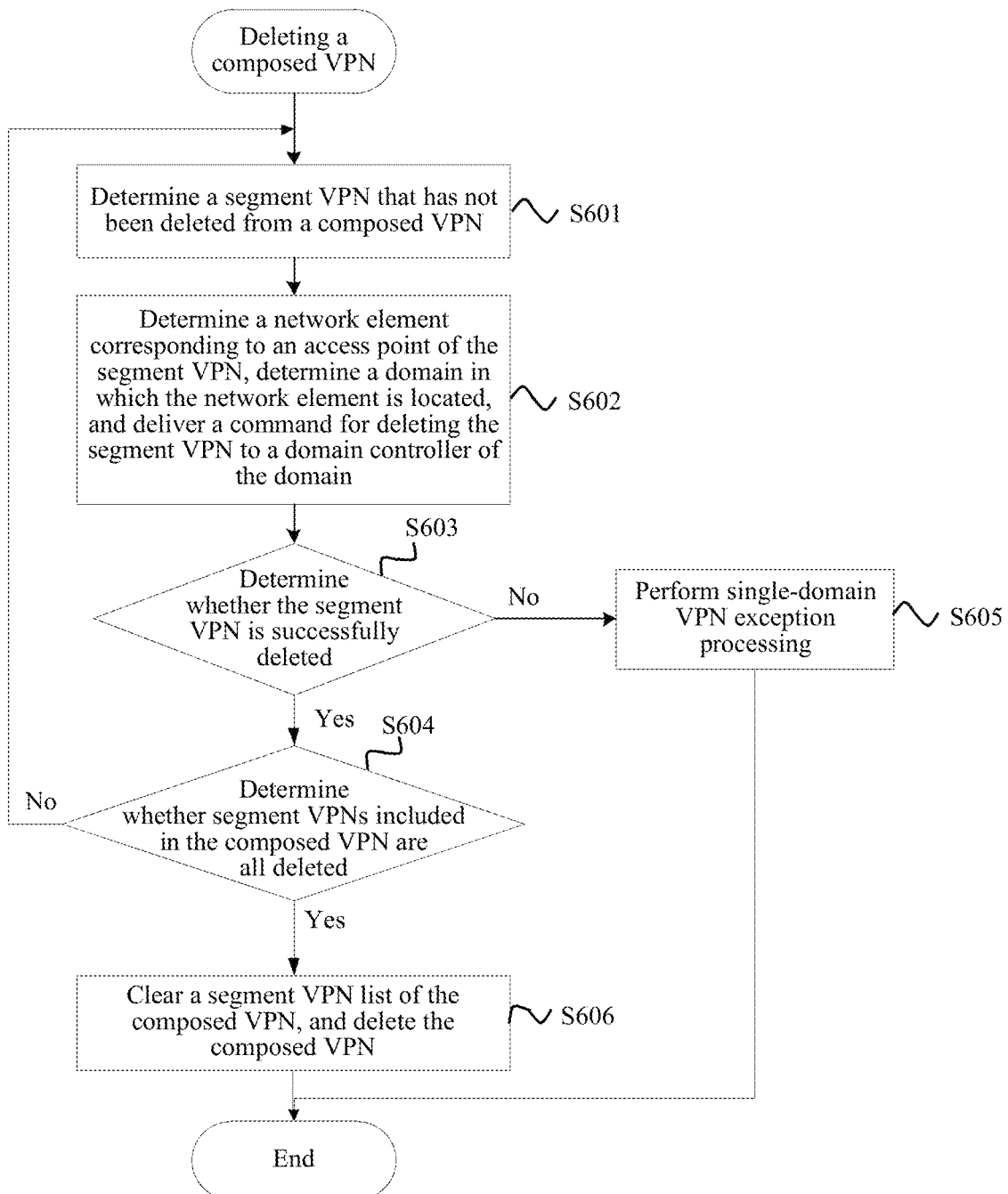
FIG. 11 is a schematic flowchart of deleting a composed VPN according to an embodiment of the present application.

Specifically, as shown in FIG. 11, FIG. 11 is a schematic flowchart of a method 600 for deleting a composed VPN according to an embodiment of the present application. The method 600 may be performed by the orchestrator shown in FIG. 3. The method 600 includes the following steps.

S601: Determine a segment VPN that has not been deleted from a composed VPN.

S602: Determine a network element corresponding to an access point of the segment VPN, determine a domain in which the network element is located, and deliver a command for deleting the segment VPN to a domain controller of the domain.

S603: Determine whether the segment VPN is successfully deleted; and if the segment VPN is successfully deleted, go to S604; or if the segment VPN is not successfully deleted, go to S605.

S604: Determine whether segment VPNs in the composed VPN are all deleted; and if the segment VPNs in the composed VPN are all deleted, go to S606; or if the segment VPNs in the composed VPN are not all deleted, go to S601.

S605: Perform single-domain VPN exception processing, and the procedure of deleting the composed VPN ends hereto.

Specifically, a status of the composed VPN is set to an out-of-synchronization state, a manual processing procedure is started, and forced deletion is performed in the manual processing procedure.

S606: Clear a segment VPN list of the composed VPN, and delete the composed VPN. The procedure of deleting the composed VPN ends hereto.

As can be learned from the foregoing embodiments described with reference to FIG. 8 to FIG. 11, the embodiments of the present application can implement automatic creation, modification, deletion functions of a composed VPN, so as to resolve a problem of relatively high management costs in the prior art due to cooperation of multiple departments during maintenance of a cross-domain and cross-technology VPN service.

The embodiments of the present application are described by using an example in which a service policy of a composed VPN is an L3VPN, but the embodiments of the present application are not limited thereto. Alternatively, the service policy of the composed VPN may be an L2VPN or a TP. When the service policy of the composed VPN is the L2VPN or the TP, a corresponding method for implementing a VPN is similar to the method for implementing a composed VPN whose service policy is the L3VPN. The method may be derived by a person skilled in the art from this specification, and this part of content also falls within the protection scope of the present application.

In conclusion, in the embodiments of the present application, the one or more segment VPNs are obtained according to the service type and the customer site that are input by the user; the composed VPN is obtained by using the one or more segment VPNs; the access point list and the segment VPN list of the composed VPN are output to the user, so that the user can learn a correlation between services in different domains related to the composed VPN, and can readily estimate a range affected by a service change of the composed VPN.

Figure 12:
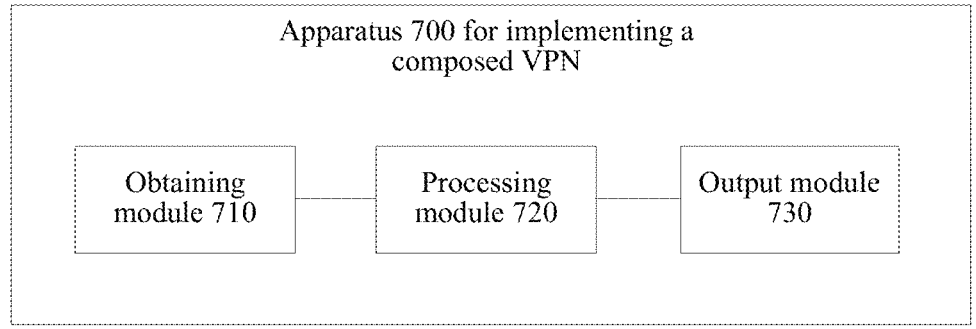
FIG. 12 is a schematic block diagram of an apparatus for implementing a composed VPN according to an embodiment of the present application.

FIG. 12 is a schematic block diagram of an apparatus 700 for implementing a composed virtual private network VPN according to an embodiment of the present application. The apparatus 700 is, for example, the orchestrator shown in FIG. 3. The apparatus 700 includes:

an obtaining module 710, configured to obtain a service type and a customer site that are input by a user;

a processing module 720, configured to determine an access point corresponding to the customer site obtained by the obtaining module, where the processing module 720 is further configured to determine one or more segment VPNs according to the service type and the access point corresponding to the customer site, where the segment VPN indicates a service connection in each of multiple domains crossed by a composed VPN; and the processing module 720 is further configured to obtain the composed VPN according to the one or more segment VPNs; and an output module 730, configured to output an access point list and a segment VPN list of the composed VPN to the user, where the access point list of the composed VPN includes information used to describe an access point of the composed VPN, the access point of the composed VPN is the access point corresponding to the customer site, and the segment VPN list includes information used to describe the one or more segment VPNs.

In this embodiment of the present application, the one or more segment VPNs are obtained according to the service type and the customer site that are input by the user; the composed VPN is obtained by using the one or more segment VPNs; the access point list and the segment VPN list of the composed VPN are output to the user, so that the user can learn a correlation between services in different domains related to the composed VPN, and can readily estimate a range affected by a service change of the composed VPN.

Figure 13:
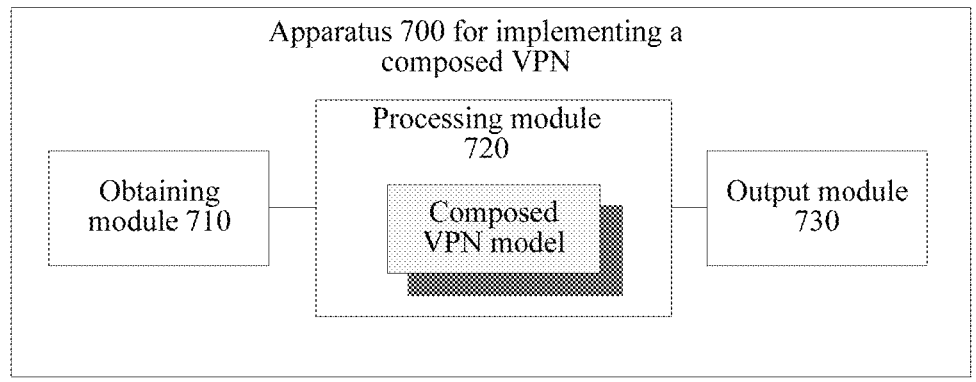
FIG. 13 is another schematic block diagram of an apparatus for implementing a composed VPN according to an embodiment of the present application.

Optionally, in this embodiment of the present application, as shown in FIG. 13, the processing module 720 is configured to obtain a composed VPN model. The composed VPN model includes a service type option, the access point list, and the segment VPN list. The composed VPN model is used to determine segment VPN information in the segment VPN list according to a service type input into the service type option and an access point input into the access point list. The processing module 720 is configured to: input the access point corresponding to the customer site into the access point list of the composed VPN model, input the service type into the service type option of the composed VPN model, and obtain the one or more segment VPNs from the segment VPN list of the composed VPN model.

Optionally, in this embodiment of the present application, the composed VPN model is used to:

determine, based on a service type library obtained by means of service orchestration, a service policy and a primary domain that correspond to the service type, where a service policy of the primary domain is the same as the service policy corresponding to the service type, the service policy is any one of the following service policies: a layer 2 L2VPN, a layer 3 L3VPN, or a termination point TP, and the service type library includes a correspondence between the service type, the service policy, and the primary domain;

determine, by using the primary domain as a target, a service access path of the access point corresponding to the customer site, where a destination node of the service access path is a boundary node of the primary domain;

determine the one or more segment VPNs according to a domain passed through by the service access path, where the segment VPN indicates a service connection in the domain passed through by the service access path; and present information about the one or more segment VPNs in the segment VPN list of the composed VPN model.

Optionally, in this embodiment of the present application, the processing module 720 is configured to: determine, based on a service type library obtained by means of service orchestration, a service policy and a primary domain that correspond to the service type, where a service policy of the primary domain is the same as the service policy corresponding to the service type, the service policy is any one of the following service policies: an L2VPN, an L3VPN, or a TP, and the service type library includes a correspondence between the service type, the service policy, and the primary domain; determine, by using the primary domain as a target, a service access path of the access point corresponding to the customer site, where a destination node of the service access path is a boundary node of the primary domain; and determine the one or more segment VPNs according to a domain passed through by the service access path, where the segment VPN indicates a service connection in the domain passed through by the service access path.

Optionally, in this embodiment of the present application, the processing module 720 is configured to: determine an access domain of the access point corresponding to the customer site, where the access domain is a domain in which the access point is located; determine an inter-domain routing path from the access domain to the primary domain; allocate port resources to domains passed through by the inter-domain routing path, and determine a service connection between ports allocated to the domains; and determine the service access path of the access point corresponding to the customer site according to the port resources allocated to the domains and the service connection between the ports allocated to the domains.

Optionally, in this embodiment of the present application, the obtaining module 710 is further configured to obtain a parameter of the composed VPN that needs to be modified.

The processing module 720 is configured to: when the parameter needing to be modified is a management status parameter, where a management status is an active state or an inactive state, determine a target segment VPN in which the access point of the composed VPN is located, and send the parameter needing to be modified to a domain controller of a domain in which the target segment VPN is located, so that the domain controller modifies, according to the parameter needing to be modified, an access point corresponding to the target segment VPN.

The processing module 720 is further configured to: if the parameter needing to be modified includes a layer parameter, search for a port that is at a same layer as the parameter needing to be modified and that is on the service access path of the access point corresponding to the customer site, and correspondingly modify the found port according to the parameter needing to be modified. The layer parameter includes a layer 2 parameter or a layer 3 parameter.

Optionally, in this embodiment of the present application, the obtaining module 710 is further configured to determine that a target customer site of the composed VPN needs to be deleted.

The processing module 720 is configured to: search for a service access path of an access point corresponding to the target customer site, and delete all objects on the service access path of the access point corresponding to the target customer site.

Optionally, in this embodiment of the present application, the obtaining module 710 is further configured to determine that the composed VPN needs to be deleted.

The processing module 720 is configured to delete all the segment VPNs of the composed VPN.

Optionally, in this embodiment of the present application, a service policy of the composed VPN is a first service policy, a service policy of a segment VPN in which a first access point in the access point of the composed VPN is located is a second service policy, a parameter of the first access point includes a parameter at a composed VPN layer and a parameter at a segment VPN layer, the parameter at the composed VPN layer includes a parameter corresponding to the first service policy, and the parameter at the segment VPN layer includes a parameter corresponding to the second service policy.

Specifically, when the service policy is the L3VPN, a parameter corresponding to the service policy includes a layer 2 parameter and a layer 3 parameter.

When the service policy is the L2VPN, a parameter corresponding to the service policy includes only a layer 2 parameter.

When the service policy is the TP, a parameter corresponding to the service policy includes a broadband service-related parameter.

Optionally, in this embodiment of the present application, the apparatus 700 further includes:

a receiving module, configured to receive a confirmation response of the user after the output module outputs the access point list, the segment VPN list, and VPN basic information of the composed VPN to the user; and a sending module, configured to send a configuration message of each segment VPN to a domain controller of a domain in which the segment VPN is located, so that the domain controller instructs a corresponding network element device to create the segment VPN.

Optionally, in this embodiment of the present application, the access point list includes the following information: configuration information of a PE device and configuration information of a CE device that correspond to the access point of the composed VPN, and further includes route configuration information of the access point. The segment VPN list includes the following information: access point information and basic information of the segment VPN.

It should be understood that the apparatus 700 according to this embodiment of the present application may correspond to the orchestrator in the method for implementing a composed VPN in the embodiments of the present application. The foregoing and other operations and/or functions of the modules in the apparatus 700 are respectively intended to implement the corresponding procedures of the methods in FIG. 4 to FIG. 11. For brevity, details are not described herein.

Figure 14:
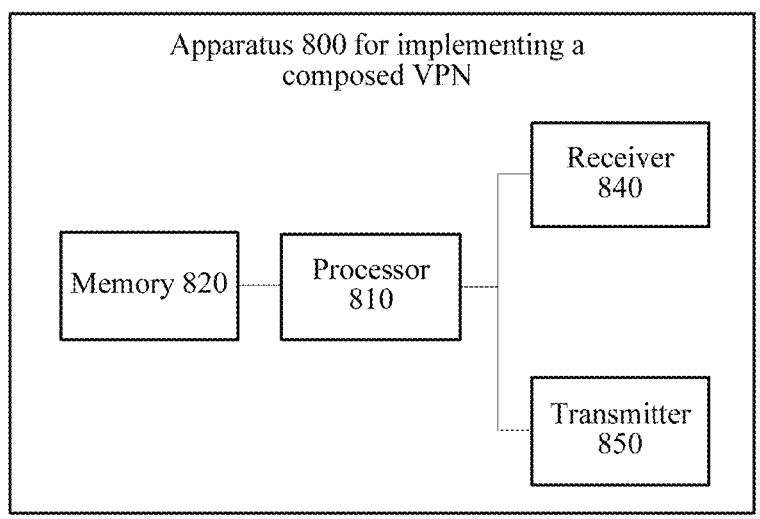
FIG. 14 is still another schematic block diagram of an apparatus for implementing a composed VPN according to an embodiment of the present application.

As shown in FIG. 14, an embodiment of the present application further provides an apparatus 800 for implementing a composed VPN. The apparatus 800 includes a processor 810, a memory 820, a receiver 840, and a transmitter 850. The processor 810, the memory 820, the receiver 840, and the transmitter 850 perform communication by using an internal communication link. The memory 820 is configured to store an instruction. The processor 810 is configured to execute the instruction stored in the memory 820, to control the receiver 840 to receive a signal and control the transmitter 850 to send a signal. The processor 810 is configured to: obtain a service type and a customer site that are input by a user; and determine an access point corresponding to the customer site; determine one or more segment VPNs according to the service type and the access point corresponding to the customer site, where the segment VPN indicates a service connection in each of multiple domains crossed by the composed VPN; obtain the composed VPN according to the one or more segment VPNs; and output an access point list and a segment VPN list of the composed VPN to the user, where the access point list of the composed VPN includes information used to describe an access point of the composed VPN, the access point of the composed VPN is the access point corresponding to the customer site, and the segment VPN list includes information used to describe the one or more segment VPNs.

In this embodiment of the present application, the one or more segment VPNs are obtained according to the service type and the customer site that are input by the user; the composed VPN is obtained by using the one or more segment VPNs; the access point list and the segment VPN list of the composed VPN are output to the user, so that the user can learn a correlation between services in different domains related to the composed VPN, and can readily estimate a range affected by a service change of the composed VPN.

Optionally, in this embodiment of the present application, the processor 810 is configured to: determine, based on a service type library obtained by means of service orchestration, a service policy and a primary domain that correspond to the service type, where a service policy of the primary domain is the same as the service policy corresponding to the service type, the service policy is any one of the following service policies: an L2VPN, an L3VPN, or a TP, and the service type library includes a correspondence between the service type, the service policy, and the primary domain; determine, by using the primary domain as a target, a service access path of the access point corresponding to the customer site, where a destination node of the service access path is a boundary node of the primary domain; and determine the one or more segment VPNs according to a domain passed through by the service access path, where the segment VPN indicates a service connection in the domain passed through by the service access path.

Optionally, in this embodiment of the present application, the processor 810 is configured to: determine an access domain of the access point corresponding to the customer site, where the access domain is a domain in which the access point is located; determine an inter-domain routing path from the access domain to the primary domain; allocate port resources to domains passed through by the inter-domain routing path, and determine a service connection between ports allocated to the domains; and determine the service access path of the access point corresponding to the customer site according to the port resources allocated to the domains and the service connection between the ports allocated to the domains.

Optionally, in this embodiment of the present application, the processor 810 is configured to: obtain a parameter of the composed VPN that needs to be modified; when the parameter needing to be modified is a management status parameter, where a management status is an active state or an inactive state, determine a target segment VPN in which the access point of the composed VPN is located, and send the parameter needing to be modified to a domain controller of a domain in which the target segment VPN is located, so that the domain controller modifies, according to the parameter needing to be modified, an access point corresponding to the target segment VPN; and when the parameter needing to be modified includes a layer parameter, search for a port that is at a same layer as the parameter needing to be modified and that is on the service access path of the access point corresponding to the customer site, and correspondingly modify the found port according to the parameter needing to be modified, where the layer parameter includes a layer 2 parameter or a layer 3 parameter.

Optionally, in this embodiment of the present application, the processor 810 is configured to: determine that a target customer site of the composed VPN needs to be deleted; and search for a service access path of an access point corresponding to the target customer site, and delete all objects on the service access path of the access point corresponding to the target customer site.

Optionally, in this embodiment of the present application, the processor 810 is configured to: determine that the composed VPN needs to be deleted; and delete all the segment VPNs of the composed VPN.

Optionally, in this embodiment of the present application, a service policy of the composed VPN is a first service policy, a service policy of a segment VPN in which a first access point in the access point of the composed VPN is located is a second service policy, a parameter of the first access point includes a parameter at a composed VPN layer and a parameter at a segment VPN layer, the parameter at the composed VPN layer includes a parameter corresponding to the first service policy, and the parameter at the segment VPN layer includes a parameter corresponding to the second service policy.

Specifically, when the service policy is the L3VPN, a parameter corresponding to the service policy includes a layer 2 parameter and a layer 3 parameter.

When the service policy is the L2VPN, a parameter corresponding to the service policy includes only a layer 2 parameter.

When the service policy is the TP, a parameter corresponding to the service policy includes a broadband service-related parameter.

Optionally, in this embodiment of the present application, the receiver 840 is configured to receive a confirmation response of the user after the access point list, the segment VPN list, and VPN basic information of the composed VPN are output to the user.

The transmitter 850 is configured to send a configuration message of each segment VPN to a domain controller of a domain in which the segment VPN is located, so that the domain controller instructs a corresponding network element device to create the segment VPN.

Optionally, in this embodiment of the present application, the access point list includes the following information: configuration information of a PE device and configuration information of a CE device that correspond to the access point of the composed VPN, and further includes route configuration information of the access point. The segment VPN list includes the following information: access point information and basic information of the segment VPN.

It should be understood that in this embodiment of the present application, the processor 810 may be a central processing unit (CPU). Alternatively, the processor 810 may be another general purpose processor, a digital signal processor (DSP), an application-specific integrated circuit (ASIC), a field programmable gate array (FPGA) or another programmable logical device, discrete gate or transistor logical device, a discrete hardware component, or the like. The general purpose processor may be a microprocessor or the processor may be any conventional processor or the like.

The memory 820 may include a read-only memory and a random access memory, and provide the instruction and data to the processor 810. A part of the memory 820 may further include a non-volatile random access memory. For example, the memory 820 may further store device type information.

During implementation, the steps of the foregoing methods may be completed by an integrated logical circuit of hardware in the processor 810 or an instruction in a software form. The steps of the methods disclosed with reference to the embodiments of the present application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 820, and the processor 810 reads information in the memory 820 and completes the steps of the foregoing methods in combination with hardware of the processor 810. To avoid repetition, details are not described herein.

It should be understood that the apparatus 800 for implementing a composed VPN according to this embodiment of the present application may correspond to the orchestrator in the method for implementing a composed VPN in the embodiments of the present application, and may correspond to the apparatus 700 in the embodiment of the present application. In addition, the foregoing and other operations and/or functions of the modules in the apparatus 800 are respectively intended to implement the corresponding procedures of the methods in FIG. 4 to FIG. 11. For brevity, details are not described herein.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in the present application shall fall within the protection scope of this application. Therefore, the protection scope of this application shall be subject to the protection scope of the claims.

What is claimed is:

1. A method for implementing a composed virtual private network (VPN), comprising:
    determining a service type and a plurality of access points;
    determining a plurality of segment VPNs based on the service type and the plurality of access points;
    obtaining a composed VPN based on the plurality of segment VPNs; and
    outputting composed VPN information describing a plurality of access points of the composed VPN.

2. The method according to claim 1, wherein the determining the plurality of segment VPNs based on the service type and the access points comprises:
    determining the plurality of segment VPNs by inputting the service type and the access points to a composed VPN model.

3. The method according to claim 1, wherein the method further comprises:
    searching for a service access path of an access point on the composed VPN; and
    deleting all objects on the service access path of the access point.

4. The method according to claim 1, wherein the method further comprises:
    determining that the composed VPN needs to be deleted; and
    deleting all the segment VPNs of the composed VPN.

5. The method of claim 1, further comprising:
    outputting segment VPN information describing the plurality segment VPNs.

6. The method of claim 1, wherein the composed VPN is an L3 VPN and the plurality of segment VPNs comprises an L2 VPN and an L3 VPN.

7. The method of claim 1, wherein the composed VPN and a first segment VPN of the plurality of segment VPNs belong to different layers respectively.

8. An apparatus for implementing a composed virtual private network (VPN), comprising:
    at least one processor; and
    a non-transitory computer-readable storage medium coupled to the at least one processor and storing programming instructions for execution by the at least one processor, wherein the programming instructions instruct the at least one processor to:
        determine a service type and a plurality of access points;

determine a plurality of segment VPNs based on the service type and the access points;

obtain a composed VPN based on the plurality of segment VPNs; and output composed VPN information describing a plurality of access points of the composed VPN.

9. The apparatus according to claim 8, wherein the programming instructions instruct the at least one processor to:

determine the plurality of segment VPNs by inputting the service type and the access points to a composed VPN model.

10. The apparatus according to claim 8, wherein the programming instructions instruct the at least one processor to:

search for a service access path of an access point on the composed VPN; and delete all objects on the service access path of the access point.

11. The apparatus according to claim 8, wherein the programming instructions instruct the at least one processor to:

determine that the composed VPN needs to be deleted; and delete all the segment VPNs of the composed VPN.

12. The apparatus of claim 8, wherein the programming instructions instruct the at least one processor to:

output segment VPN information describing the plurality segment VPNs.

13. The apparatus of claim 8, wherein the composed VPN is an L3 VPN and the plurality of segment VPNs comprises an L2 VPN and an L3 VPN.

14. The apparatus of claim 8, wherein the composed VPN and a first segment VPN of the plurality of segment VPNs belong to different layers respectively.

* * * * *